US012495771B2

(12) United States Patent
Ver Steeg

(10) Patent No.: US 12,495,771 B2
(45) Date of Patent: Dec. 16, 2025

(54) FEEDBUNK VOLUME ESTIMATION VIA IMAGE SEGMENTATION

(71) Applicant: CAN TECHNOLOGIES, INC., Wayzata, MN (US)

(72) Inventor: Nickolas Junior Ver Steeg, Midway, UT (US)

(73) Assignee: CAN TECHNOLOGIES, INC., Wayzata, MN (US)

( * ) Notice: Subject to any disclaimer, the term of this patent is extended or adjusted under 35 U.S.C. 154(b) by 222 days.

(21) Appl. No.: 18/264,305

(22) PCT Filed: Feb. 9, 2022

(86) PCT No.: PCT/US2022/070584
§ 371 (c)(1),
(2) Date: Aug. 4, 2023

(87) PCT Pub. No.: WO2022/174228
PCT Pub. Date: Aug. 18, 2022

(65) Prior Publication Data
US 2024/0099272 A1    Mar. 28, 2024

Related U.S. Application Data

(60) Provisional application No. 63/147,902, filed on Feb. 10, 2021.

(51) Int. Cl.
*A01K 29/00* (2006.01)
*A01K 5/02* (2006.01)
(Continued)

(52) U.S. Cl.
CPC .......... *A01K 29/005* (2013.01); *A01K 5/0283* (2013.01); *G06T 7/12* (2017.01);
(Continued)

(58) Field of Classification Search
CPC ...... G06V 10/26; G06V 20/68; A01K 5/0283; A01K 5/02; A01K 29/005; G06T 7/12;
(Continued)

(56) References Cited

U.S. PATENT DOCUMENTS 11,937,580 B2 * 3/2024 Dorea ................ H04N 7/181
12,302,866 B2 * 5/2025 Dorea ................ G06T 7/70
(Continued)

FOREIGN PATENT DOCUMENTS

CN    103674857 A  *  3/2014  .......... G06T 7/0004
CN    208362308 U  *  1/2019
(Continued)

OTHER PUBLICATIONS

Shelley, Anthony N., "Monitoring Dairy Cow Feed Intake Using Machine Vision" (2013). Theses and Dissertations—Electrical and Computer Engineering. 24. https://uknowledge.uky.edu/ece_etds/24 (Year: 2013).*

(Continued)

*Primary Examiner* — Michael Robert Cammarata

(57) ABSTRACT

Disclosed are embodiments for segmenting an animal feed bunk. The feed bunk is segmented, in some embodiments, into segments that include reachable animal feed, and other segments that include unreachable animal feed. Volume estimates of feed in each of the segments are generated, in some embodiments, via imaging data of the feed bunk captured by a LIDAR sensor or passive optical sensor. The volume estimates trigger alerts in some instances indicating feed shortages or a need for a push up operation to move feed from an unreachable segment to a reachable segment. Demarcation of feeding events, coupled with volume estimations of feed remaining provide for determination of refusal volumes, which are useful in determining animal appetite.

38 Claims, 14 Drawing Sheets

(51) Int. Cl.
    *G06T 7/12*     (2017.01)
    *G06T 7/62*     (2017.01)
    *G06V 10/26*    (2022.01)
    *G06V 20/68*    (2022.01)

(52) U.S. Cl.
    CPC ............... *G06T 7/62* (2017.01); *G06V 10/26* (2022.01); *G06V 20/68* (2022.01); *G06T 2207/10028* (2013.01); *G06T 2207/20081* (2013.01); *G06T 2207/20092* (2013.01); *G06T 2207/30128* (2013.01); *G06T 2207/30188* (2013.01)

(58) Field of Classification Search
    CPC . G06T 2207/30128; G06T 2207/30188; G06T 7/62
    See application file for complete search history.

(56) References Cited

U.S. PATENT DOCUMENTS

| | | | |
|---|---|---|---|
| 2012/0085288 A1 | 4/2012 | Salinas et al. | |
| 2012/0089340 A1* | 4/2012 | Huisma | A01K 29/005 702/19 |
| 2016/0066546 A1* | 3/2016 | Borchersen | A01K 11/004 382/110 |
| 2017/0086429 A1* | 3/2017 | Horton | A01K 5/02 |
| 2020/0125849 A1* | 4/2020 | Labrecque | G06T 7/0008 |
| 2020/0196568 A1* | 6/2020 | Robertson | A01K 5/0291 |
| 2022/0287276 A1* | 9/2022 | Dorea | G06V 20/52 |

FOREIGN PATENT DOCUMENTS

| | | | | |
|---|---|---|---|---|
| CN | 110415209 A | * | 11/2019 | ........... G06T 7/0002 |
| CN | 111109105 A | | 5/2020 | |
| EP | 2983465 B1 | * | 10/2020 | ............. A01K 29/00 |
| KR | 20250094975 A | * | 6/2025 | ............. G06Q 30/06 |
| WO | 2020003310 A1 | | 1/2020 | |
| WO | 2020163484 A1 | | 8/2020 | |

OTHER PUBLICATIONS

Bach, A., C. Iglesias, and I. Busto. "A computerized system for monitoring feeding behavior and individual feed intake of dairy cattle." Journal of dairy science 87.12 (2004): 4207-4209. (Year: 2004).*

Achour, Brahim, et al. "Image analysis for individual identification and feeding behaviour monitoring of dairy cows based on Convolutional Neural Networks (CNN)." Biosystems Engineering 198 (2020): 31-49. (Year: 2020).*

Bezen, Ran, Yael Edan, and Ilan Halachmi. "Computer vision system for measuring individual cow feed intake using RGB-D camera and deep learning algorithms." Computers and electronics in agriculture 172 (2020): 105345. (Year: 2020).*

Bloch, V., Levit, H., & Halachmi, I. (2019). Assessing the potential of photogrammetry to monitor feed intake of dairy cows. Journal of Dairy Research, 86(1), 34e39. https://doi.org/10.1017/s0022029918000882 (Year: 2019).*

Neethirajan, "The role of sensors, big data and machine learning in modern animal farming. Sensing and Bio-Sensing Research." Aug. 1, 2020;29:100367, 8 pages.

Shelley et al., "Measuring feed volume and weight by machine vision." Journal of dairy science. Jan. 1, 2016;99(1):386-391.

* cited by examiner

Feed Availability (by Weight)

| Section | Pen 1 {scan time: 5:00 AM; feeding time: 5:30 AM; minutes to next feeding: 30} | | | Pen 2 {scan time: 5:05 AM; feeding time: 5:35 AM; minutes to next feeding: 90} | | | All Pens | | |
|---|---|---|---|---|---|---|---|---|---|
| | Reachable Feed Weight (lbs) | Unreachable Feed Weight (lbs) | Available Feed Weight (lbs) | Reachable Feed Weight (lbs) | Unreachable Feed Weight (lbs) | Available Feed Weight (lbs) | Reachable Feed Weight (lbs) | Unreachable Feed Weight (lbs) | Available Feed Weight (lbs) |
| 1 | 6 | 0 | 6 | 0 | 12 | 12 | | | |
| 2 | 12 | 0 | 12 | 0 | 12 | 12 | | | |
| 3 | 12 | 0 | 12 | 6 | 12 | 18 | | | |
| 4 | 6 | 0 | 6 | 0 | 18 | 18 | | | |
| 5 | 6 | 0 | 6 | 0 | 18 | 18 | | | |
| 6 | 12 | 0 | 12 | 0 | 18 | 18 | | | |
| 7 | 12 | 0 | 12 | 6 | 12 | 18 | | | |
| 8 | 18 | 0 | 18 | 6 | 12 | 18 | | | |
| 9 | 24 | 0 | 24 | 6 | 12 | 18 | | | |
| 10 | 6 | 0 | 6 | 12 | 6 | 18 | | | |
| Total | 114 | 0 | 114 | 36 | 132 | 168 | 150 | 132 | 282 |
| Average | 11.4 | 0 | 11.4 | 3.6 | 13.2 | 16.8 | 7.5 | 6.6 | 14.1 |

Refusal Analysis

| Pen | Count | Refusal Scan Time | 1st Feeding Time | Minutes to 1st Feeding | Reachable Refusal Weight (Lbs) | Unreachable Refusal Weight (Lbs) | Measured Refusal Weight (Lbs) | Previous Scans Usable Unreachable Feed Average | Estimated Additional Unreachable Adjustment | Adjusted True Refusal |
|---|---|---|---|---|---|---|---|---|---|---|
| 1 | 100 | 5:00 AM | 5:30 AM | 30 | 342 | 0 | 342 | 256 | -150 | 192 |
| 2 | 100 | 5:30 AM | 5:55 AM | 25 | 108 | 390 | 504 | 230 | 0 | 108 |
| 3 | 100 | 6:00 AM | 6:15 AM | 15 | 280 | 102 | 382 | 181 | -100 | 180 |
| 4 | 100 | 6:30 AM | 6:50 AM | 20 | 289 | 0 | 289 | 90 | -50 | 239 |
| 5 | 100 | 7:00 AM | 7:20 AM | 20 | 160 | 120 | 280 | 163 | -90 | 70 |
| Total | | | | | 1179 | 612 | 1797 | 922 | -390 | 789 |

FEEDBUNK VOLUME ESTIMATION VIA IMAGE SEGMENTATION

CROSS-REFERENCE TO RELATED APPLICATIONS

This application is a national phase application of PCT Application No. PCT/US2022/070584, filed Feb. 9, 2022, which claims the benefit of U.S. Provisional Application No. 63/147,902, filed Feb. 10, 2021, each of which is incorporated by reference herein in its entirety.

BACKGROUND

Animal farming is a competitive industry. The market demands animal products be delivered at very competitive costs and under strict health and safety regulations. One aspect of ensuring delivery of competitive animal products is to closely manage the feeding of the animals. This includes not only the types of food provided to the animals but also the amounts and timing of the feed delivery. Proper feeding of animals is critical to establishing proper weight and nutrition. Animals are often fed via use of a feed bunk, which provides a storage location for feed that is consumed by the animals as needed. Therefore, improved methods of managing animal feed bunks are needed.

BRIEF DESCRIPTION OF THE DRAWINGS

FIG. 4 is a table showing example feed availability metrics.

FIG. 6 is an example report implemented by one or more of the disclosed embodiments.

FIG. 7 is an example report implemented in one or more of the disclosed embodiments.

FIG. 8 is an example report generated in one or more of the disclosed embodiments.

DETAILED DESCRIPTION

Figure 1:
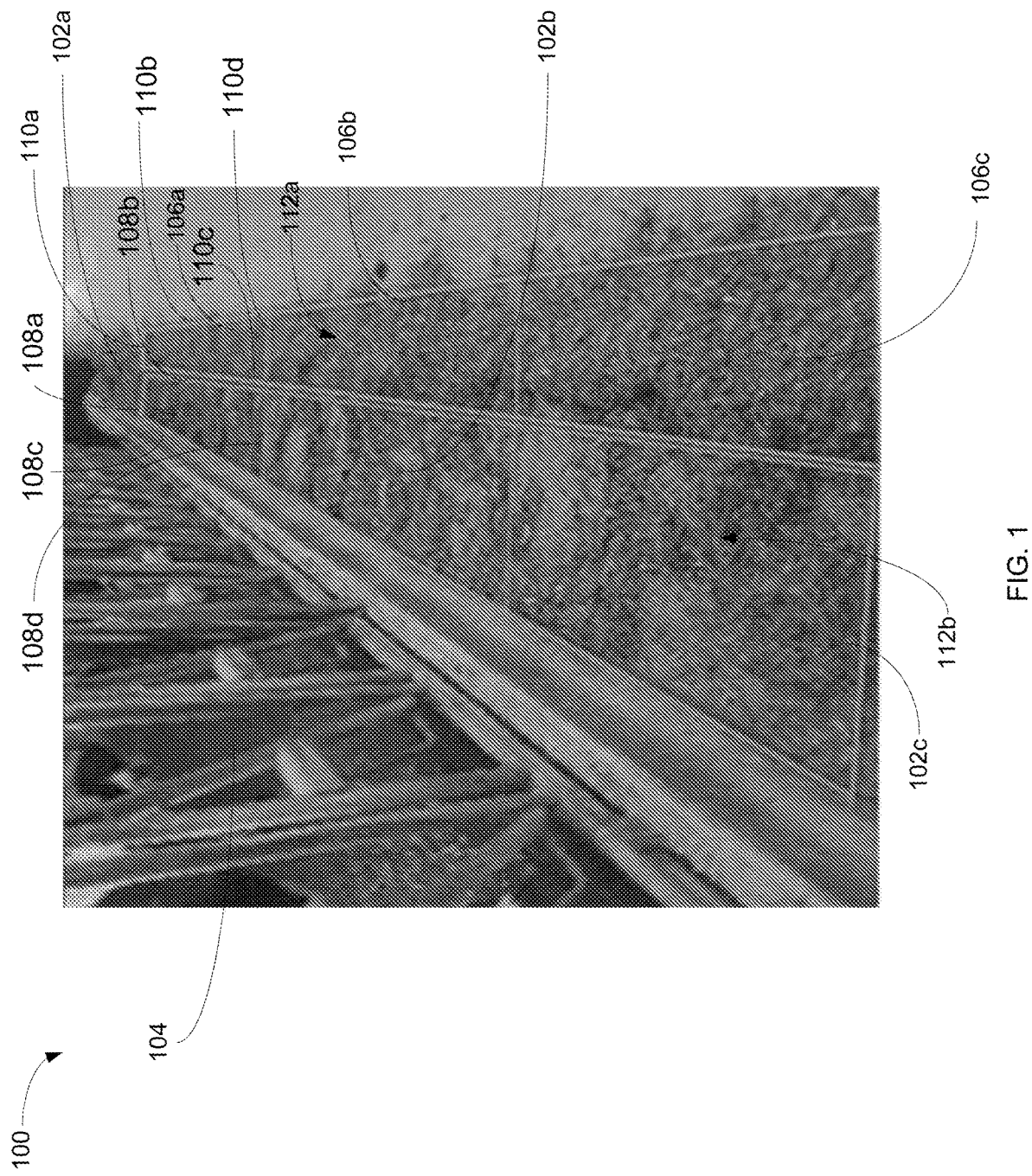
FIG. 1 shows an example segmentation of a feed bunk.

As discussed above, proper management of animal feeding is important in delivering competitive animal products to market. Feeding of animals is sometimes accomplished via the use of feed bunks, which are common storage areas for feed used by multiple animals. It is relatively common for at least one portion of a feed bunk to be emptied of food by the animals before it can be refilled. For example, easily accessible portions of the feedback empty first, while more difficult to reach portions of the feed bunk contain food for a longer period of time. Areas of feed bunks proximate to water troughs also empty first in some environments. This uneven distribution of feed within the feed bunk can hamper feeding of the animals, since there is less total area available to provide feed for animals. In pens with a relatively large number of animals, some animals may be forced to wait for feed until other animals voluntarily move away from portions of the feed bunk that include feed. To further complicate animal feeding, some animals are territorial with respect to areas in which they eat, and may not move to a different area of the feed bunk containing feed after a supply of feed in "their" area is exhausted.

Shared feed bunks have additional problems. For example, as animals consume feed, they can tend to push some of the food away from the feeding area (e.g. with their noses or snouts). This push away process results in some portion of the feed becoming unreachable to the animals. Farmers are accustomed to pushing feed within a feed bunk back into a position where it can be reached by the animals. However, this manual process does not necessarily occur as frequently as necessary, resulting in at least some food languishing in the feed bunk because it is not reachable.

Thus, in environments where access and/or distribution of feed is not uniform, even if a total amount of feed provided in the bunk may be an ideal amount, the unequal distribution and consumption of food within the bunk can result in sub-optimal feeding of animals. Some animals may not be able to obtain sufficient food, in part due to competition with other animals for space at portions of the feed bunk containing food. Animals that receive an insufficient amount of food generally have lower weight and/or milk production (e.g. dairy cattle). Animals can also experience more severe adverse health consequences from an inadequate supply of food.

The disclosed embodiments recognize that existing solutions do not adequately manage feed supply with a feed bunk used by a plurality of animals. Furthermore, existing solutions do not present actionable information on feed availability, nor information indicating reachable versus unreachable feed availability.

The disclosed embodiments further recognize that refusals play an important role in feed bunk management. Refusals are the amounts of feed that animals do not eat. Some of the disclosed embodiments subtract these amounts from amounts of food delivered to each feed bunk and thus determine an intake of feed by the animals. Intake is a relatively important metric as it indicates how much food is being consumed by the animals. Intake is used to determine performance metrics for efficiency and profitability. Intake is also a foundation for estimates of future feeding amounts. For example, to determine an amount of feed to provide to the animals, intake during previous time periods is highly relevant. Existing solutions rely on manual recording of refusals, which is a time consuming, expensive, and error prone process. When relying on manual recording of refusals, many producers do not weigh refusals to obtain an accurate measurement, but instead estimate the amount based on a visual analysis. This results in estimates which can be very inaccurate, resulting in inaccurate intake values. This inaccuracy results in decreases in feed bunk management effectiveness. Additionally, these manual estimates of refusal do not necessarily delineate between food that voluntarily remained unconsumed, and that portion of the "refusal" which was not eaten because it was unreachable.

This introduces further inaccuracy in the refusal and intake estimates, further eroding the effectiveness of feed bunk management.

The disclosed embodiments are generally directed to a feed bunk image analysis method that provides for a determination of feed availability metrics to identify deficiencies in feeding procedures. These capabilities include an ability to identify areas of a feed bunk that generally receive heavy usage from animals, and thus should be stocked with larger amounts of food than other less popular areas of the feed bunk. Some embodiments identify times of day when a larger number or frequency of food push up operations are required, to reduce an amount of unreachable food and maintain feed supply in the feed bunk. Some of the disclosed embodiments generate an alert when certain conditions in a feed bunk are detected. For example, some embodiments generate an alert indicating feed should be redistributed within a feed bunk, for example, as a result of some portions of the bunk being depleted of food while other portions have substantial feed remaining.

Some embodiments analyze feed bunk image to determine a reachable and unreachable feed amounts shortly before any remaining food is removed. This automated process is more accurate and less time consuming that previous manual processes which included weighing of any refusal amount within each feed bunk or animal pen. Automated determination of unreachable feed amounts also further improves accuracy of refusal amounts. Increased accuracy of refusal amounts increases accuracy of intake determinations. Thus, the disclosed embodiments provide for a more accurate determination of animal appetite, which is not available with existing methods.

FIG. 1 shows an example segmentation of a feed bunk. An image 100 shows a feed bunk that has been divided into six segments. A first set of segments labeled segment 102a, segment 102b, and segment 102c, are located near an animal access area 104. A second set of segments labeled as segment 106a, segment 106b, and segment 106c are further away from the animal access area 104. Each of the segments 102a-c and 106a-c are defined by segment boundaries. A portion of the segment boundaries are labeled in FIG. 1. For example, the segment 102a is defined by a boundary 108a, a boundary 108b, a boundary 108c, and a boundary 108d. The segment 106a is defined by a boundary 110a, a boundary 110b, a boundary 110c, and a boundary 110d. As the segments illustrated in FIG. 1 are substantially rectangular in nature, some of the boundaries of a particular segment are parallel to each other, while other boundaries of a particular segment are perpendicular to each other. The segments shown in FIG. 1 are arranged in rows. For example, segments 102a-c represent a first row of segments while segments 106a-c represent a second row of segments.

In some embodiments, at least some segment share a common boundary. For example, the boundary 108a and the boundary 110c are considered a common boundary between the segments 102a and 106a. Segment 102a and segment 106a are considered corresponding segments in some embodiments, as they share a common boundary (e.g. boundary 108b and boundary 110c), or the have boundaries that are substantially adjoining each other, and they have two other segment boundaries that are arranged linearly to each other. For example, boundary 108a and boundary 110a are arranged linearly with respect to each other. Boundary 108d of segment 102a and boundary 110d of segment 106a are also arranged linearly with respect to each other.

The other segments 102b-c and 106b-c also include analogous boundaries, but those boundaries are not labeled to preserve figure clarity. Also shown within the feed bunk are distributions of animal feed, examples of which are labeled as feed 112a and feed 112b.

Some of the disclosed embodiments analyze an image of a feed bunk, such as the image 100, to determine volumes of feed in each of a plurality of segments or portions of the feed bunk. As discussed above, in some embodiments, a volume of reachable feed and/or a volume of unreachable feed in one or more of the segments are determined. For example, in some embodiments, the segments 102a-c represent reachable feed, while the segments 106a-c represent unreachable feed in some embodiments. In some embodiments, when a volume of feed included in one or more of the unreachable segments 106a-c reaches one or more predefined thresholds, an alert is generated indicating that a producer should initiate a "push back" operation. The "push back" operation moves at least a portion of the feed (e.g. 110a) contained with one of the segments 106a-c into one of the segments 102a-c.

Figure 2:
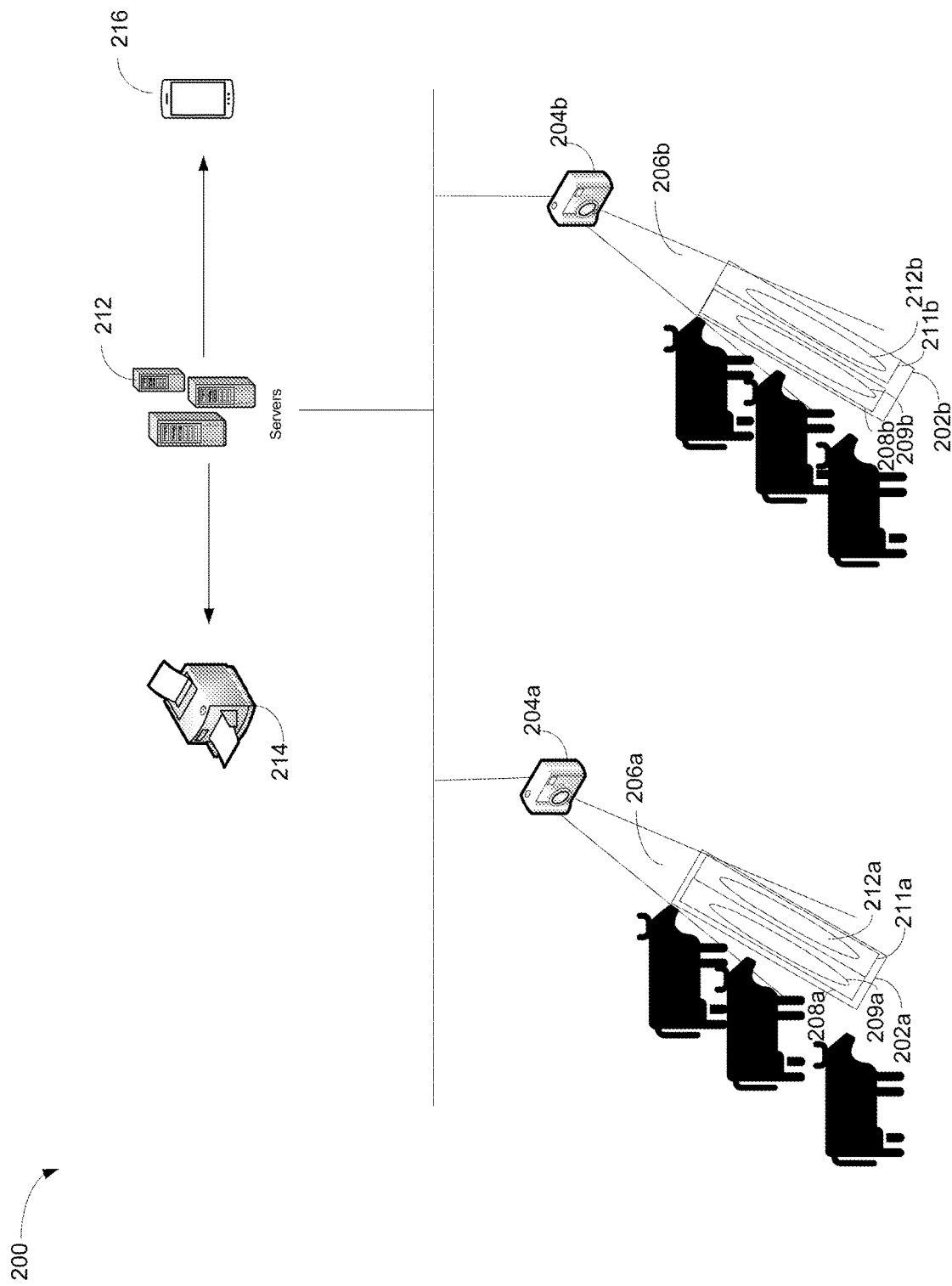
FIG. 2 illustrates an example deployment of a system implementing one or more of the disclosed embodiments.

FIG. 2 illustrates an example deployment of a system implementing one or more of the disclosed embodiments. The system 200 includes two feed bunks, feed bunk 202a and feed bunk 202b. Each feed bunk is with a field of view of an imaging sensor, shown as imaging sensor 204a and imaging sensor 204b, with field of view 206a and field of view 206b respectively. Within each of the field of view 206a and field of view 206b are a reachable feed segment 208a and a reachable feed segment 208b respectively. Within each of the field of view 206a and field of view 206b are an unreachable feed segment 211a and an unreachable feed segment 211b respectively. Each of the reachable feed segment 208a and the reachable feed segment 208b includes reachable feed 209a and reachable feed 209b respectively. Each of the unreachable feed segment 211a and the unreachable feed segment 211b include unreachable feed 212a and unreachable feed 212b respectively.

Imaging data collected by each of the imaging sensor 204a and imaging sensor 204b is provided to a control system 212. As discussed above, the control system 212 computes volumes of feed within each of the reachable feed segment 208a and the reachable feed segment 208b. In some embodiments, the control system 212 computers volumes of feed within each of the unreachable feed segment 211a and the unreachable feed segment 211b. Results of this analysis is provided, in some embodiments, via reports represented by report printer 214. In some embodiments, the control system 212 generates one or more alerts, for example, to a smart phone 216. The alerts indicate, in some embodiments, one or more particular conditions within the feed bunk 202a and/or the feed bunk 202b.

Figure 3:
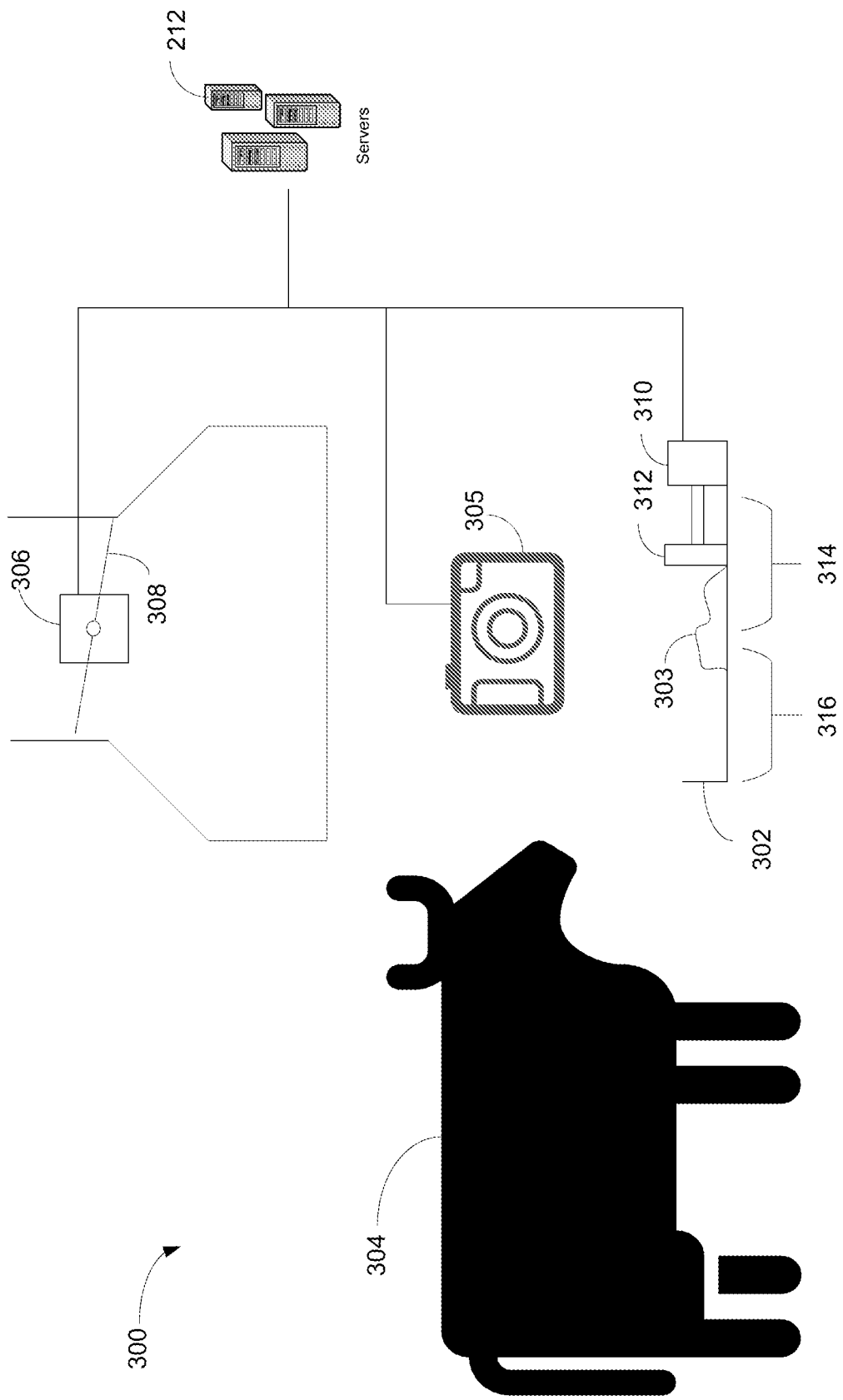
FIG. 3 is an overview diagram of a system implemented in one or more of the disclosed embodiments.

FIG. 3 is an overview diagram of a system 300 implemented in one or more of the disclosed embodiments. FIG. 3 shows a side view of a feed bunk 302 that includes animal feed 303. The feed bunk 302 is accessible to an animal 304. The feed bunk 302 is within a field of view of an imaging sensor 305, which provides images of the feed bunk 302 to the control system 212. As discussed above, in some embodiments, the control system 212 analyzes an image of the feed bunk 302 to determine a volume of reachable feed and/or unreachable feed within the feed bunk 302, of which the animal feed 303 forms a portion. Within the example system 300 of FIG. 3, the control system 212 controls a feed dispenser 306 based on, in part, a volume of feed determined to be included in the feed bunk 302. The feed dispenser 306 dispenses feed from above the feed bunk 302 via a flapper valve 308. In some embodiments, the control system 212 dispenses feed upon a finding that a combination or reachable feed within a reachable feed portion 316 and unreachable feed within an unreachable feed portion 314 is below a threshold. In some embodiments, dispensing of the feed via the feed dispenser 306 is also based on a feed schedule and/or time of day. FIG. 3 also shows that the feed bunk 302 is configured with a feed pusher motor 310 which can activate a ram 312 to move feed from the unreachable feed portion 314 of the feed bunk 302 to the reachable feed portion 316.

FIG. 4 is a table showing example feed availability metrics. FIG. 4 shows an embodiment that determines reachable feed 402, unreachable feed 404, and available feed 406 (in weight) for two pens, shown in each of column 408 and column 410. FIG. 4 also shows that the reachable, unreachable, and available feed metrics are aggregated in some embodiments, to show data for all pens in column 412. Within each of the column 408 and column 410 include reachable feed 402, unreachable feed 404, and available feed 406 for each of a plurality of sections 414. Total reachable feed is shown in column 408 as total 416. Total unreachable feed is shown in column 408 as total 418. Total available feed is shown in column 408 as total 420. Average reachable feed across the sections 414 is shown as average 422. Average unreachable feed across the sections 414 is shown as average 424. Average available feed across the sections 414 is shown as average 426. Analogous data is shown in columns 410 and 412, but is not labeled to preserve figure clarity.

Figure 5:
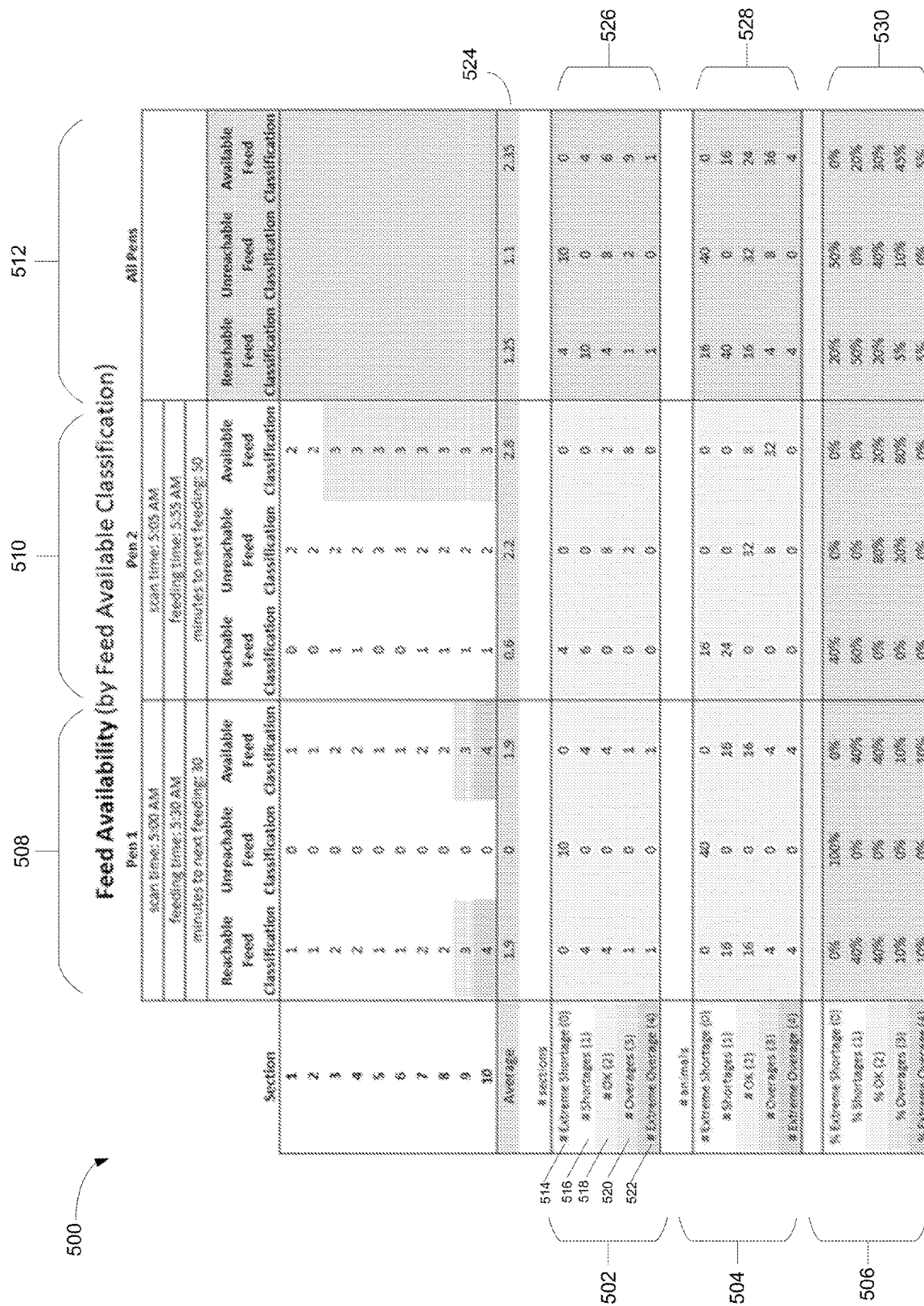
FIG. 5 is an example report generated by one or more of the disclosed embodiments.

FIG. 5 is an example report generated by one or more of the disclosed embodiments. Similar to report 400 of FIG. 5, the report 500 of FIG. 5 includes three columns, labeled as column 508, column 510, and column 512. FIG. 5 shows additional data relative to the report 400 of FIG. 4. In particular, the report 500 of FIG. 5 includes shortage and overage information in a sections portion 502, an animal portion 504, and a percentages portion 506. The sections portion 502 defines instances or numericities of extreme shortages 514 (e.g. feed levels below a first predefined threshold), shortages 516 (e.g. feed levels below a second predefined threshold but above the first predefined threshold), nominal feed levels 518 (e.g. feed levels between a lower predefined nominal threshold and an upper predefined nominal threshold), overages 520, (e.g. feed levels above the upper predefined nominal threshold but below a predefined extreme overage lower bound), and extreme overages 522 (e.g. a feed level above the predefined extreme overage lower bound). Analogous metrics are defined for the animal portion 504 and the percentages portion 506 of the report 500. The percentages portion 506 represents a percent of measurements falling within the different classifications described above, whereas the sections portion 502 and animal portion 504 convey numericity of measurements within the described classifications. In some embodiments, color coding is used to highlight areas of shortages or overages. Color coding is different for reachable feed versus unreachable feed, at least in some embodiments. Analogous data is provided for column 510, representing a second pen.

Similar to FIG. 4, the report 500 of FIG. 5 includes a column 512 which summarizes data from columns 508 and 510. For example, averages 524 and aggregations 526 and 528 of data provided in column 508 and column 510 are presented in column 512. The percentages 530 of column 512 are average percentages across column 508 and column 510.

Figure 6:
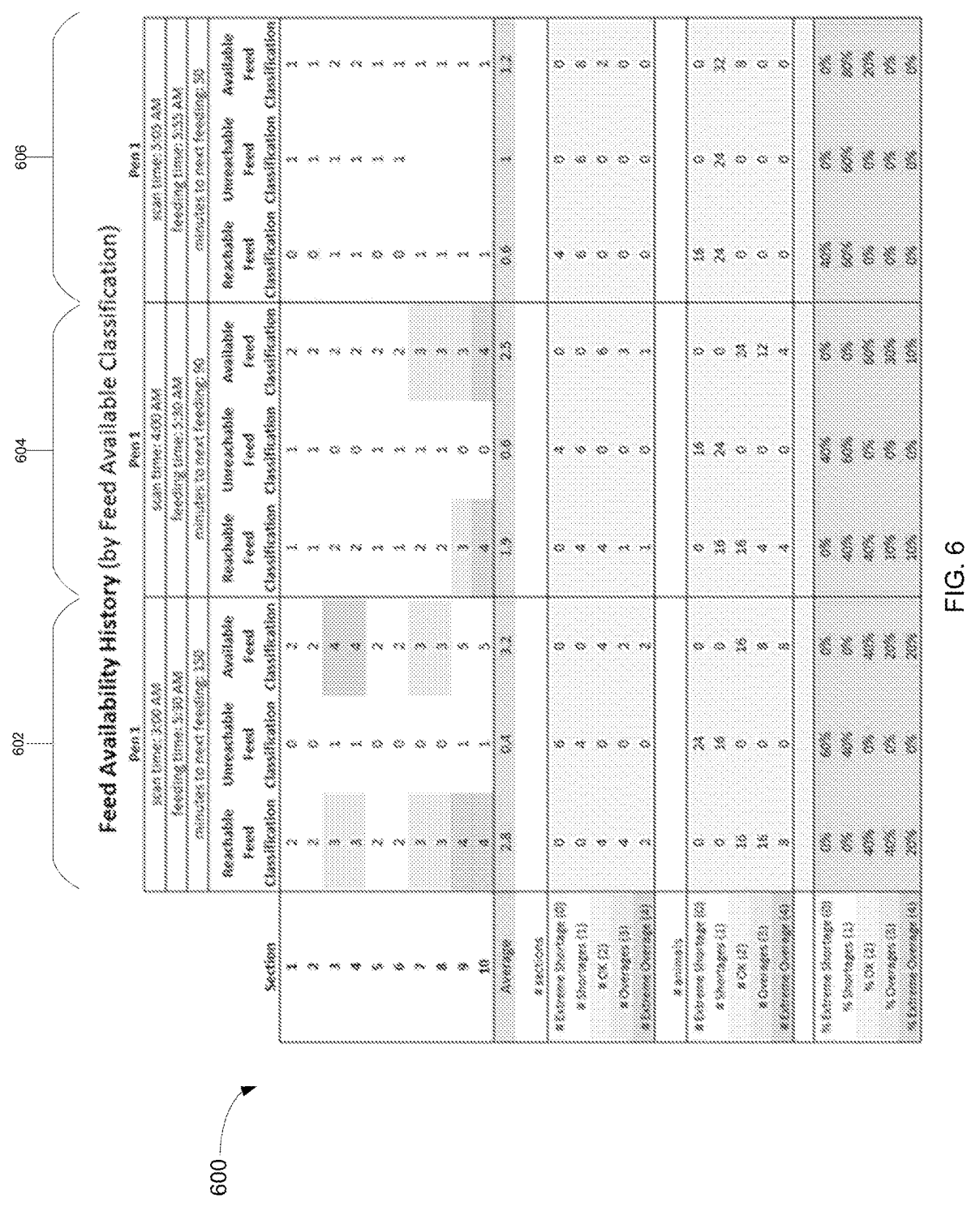

FIG. 6 shows an example report 600 implemented by one or more of the disclosed embodiments. FIG. 6 shows information similar to that described above with respect to FIG. 5, except that whereas the report 500 of FIG. 5 shows information for a plurality of different feed bunks or pens in different columns (e.g. columns 508, 510, and 512), the report 600 shows information for a common pen or feed bunk in several columns, with the several columns representing data collected from the common pen or feed bunk at different times. For example, each of columns 602, 604, and 606 show data collected at 3 AM, 4 AM, and 5:05 AM respectively.

The report 600 shows a reduction of feed available as time elapses (via the multiple columns of data collected at different times). The report 600 also shows missed fed pushup opportunities by showing unreachable feed situations.

FIG. 7 shows an example report 700 implemented in one or more of the disclosed embodiments. The example report 700 shows results of a refusal analysis. Some embodiments provide for the designation of particular data collections to be refusal collections. In other words, a particular data collection is designated, in some embodiments, to represent a final scan of a feeding activity, with any remaining feed detected during the scan (that is reachable) to represent feed animals refused to consume. The report 700 shows that per section weights or volumes are aggregated into per pen weights or volumes. This aggregation is performed for each of reachable refusal, unreachable refusal, and measured refusal.

The example report 700 shows data for a plurality of pens or feed bunks 702. The report 700 displays individual pen identification 704, an animal count 706 in each of the pens, a refusal scan time 708, a first feeding time 710, a minutes from refusal removal to a first feeding time 712, a reachable refusal weight column 714, unreachable refusal weight column 716, and a measured refusal weight/volume 718 (e.g., measured refusal weight=reachable refusal weight/volume+unreachable refusal weight/volume). The report 700 also includes data from previous scans 720, an estimated additional unreachable adjustment 722, and an adjusted true refusal 724. The previous scans 720 illustrate that previously unreachable feed may impact a total amount that an animal can eat. The estimated additional unreachable adjustment 722 provides an opportunity for a user to evaluate the previous scans 720 and make appropriate adjustments. For example, in report 700, Pen 1 shows an average of 256 pounds unreachable feed in previous scans 720. A user has knowledge that people were in the pen and feeding the animals during the previous scan. During those previous scans, it is also observable that reachable feed is low. These observations lead a user to conclude that the animals would have eaten more if the feed had been available during those times. Thus, a user may elect to make an additional refusal adjustment, subtracting 150 lbs. from the reachable refusal of 192 lbs.

Figure 8:
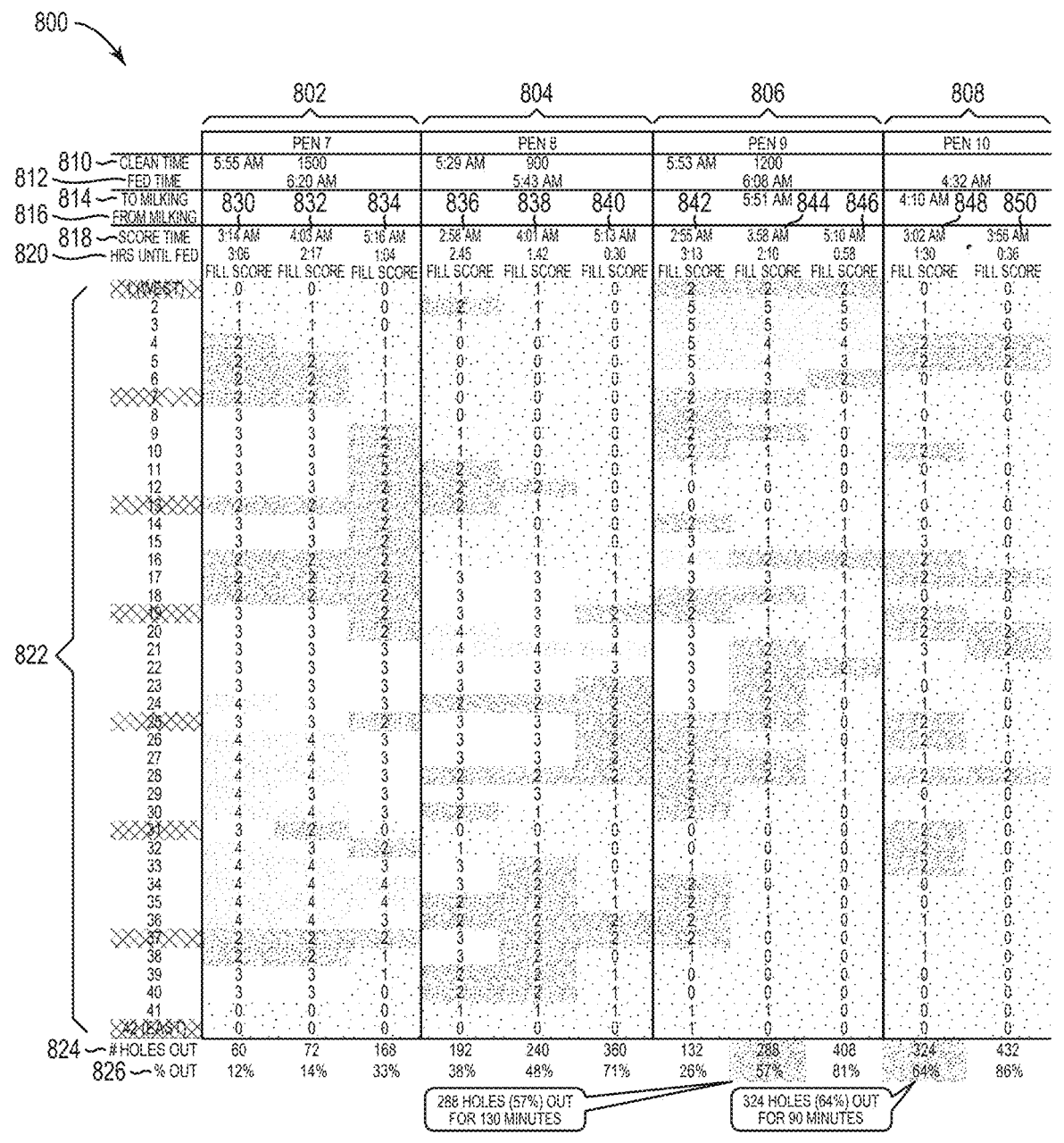

FIG. 8 shows an example report 800 generated in one or more of the disclosed embodiments. The report 800 of FIG. 8 presents information for a plurality of animal pens, arranged in a corresponding plurality of columns, labeled as column 802, column 804, column 806, and column 808. For each of the plurality of pens, the report 800 displays a cleaning time 810, a fed time 812, a to milking time 814, a from milking time 816, a score time 818, and an hours until fed time 820. Each of the pens includes a plurality of "holes" or feedings areas, shown collectively as rows 822 in the report 800. Each of the plurality of pens are evaluated at a corresponding plurality of times to determine how full each of the holes" within each pen are, resulting in a fill score. For example, pen 7, shown in column 802, is evaluated at three different times, shown as time 830, time 832, and time 834. Pen 8, shown in column 804, is evaluated at time 836, 838, and 840. Pen 9, shown in column 806, is evaluated at time 842, 844, and 846. Pen 10, shown in column 808, is evaluated at time 848 and time 850.

Report 800 also generates summary information, including a count 824 of a number of feelings holes within each pen that are out of food. The report 800 also shows a percentage 826 of holes that are out of food.

Figure 9:
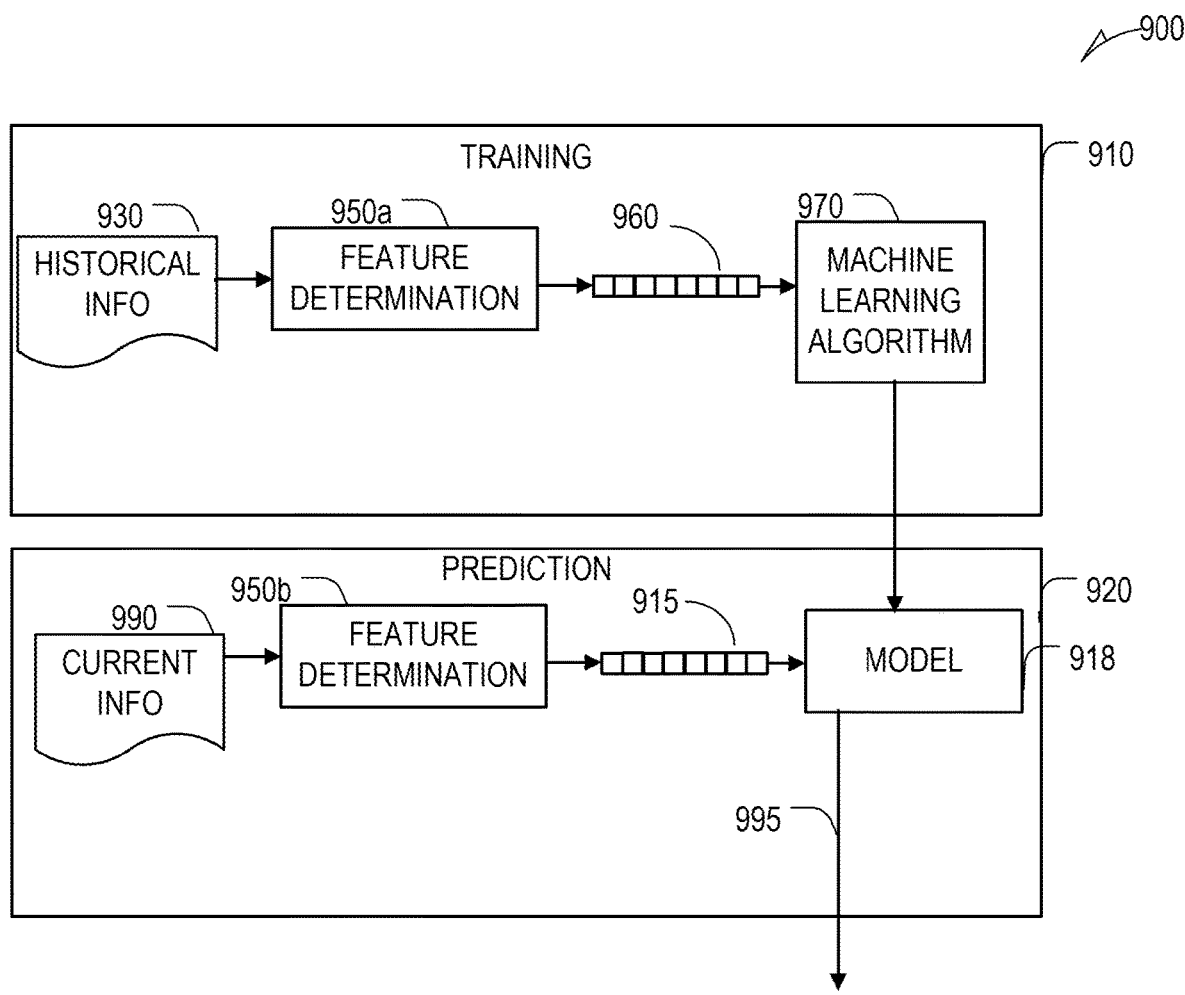
FIG. 9 is an example machine learning module according to some examples of the present disclosure.

FIG. 9 shows an example machine learning module 900 according to some examples of the present disclosure. Machine learning module 900 utilizes a training module 910 and a prediction module 920. Training module 910 inputs historical information 930 into feature determination module 950*a*. The historical information 930 may be labeled. Example historical information may include historical images of feed bunks and feed contained within the feed bunks. For example, historical images representing the reachable feed segment 208*a* and the reachable feed segment 208*b* are included in the historical information 930 in some embodiments. Historical images representing the unreachable feed segment 211*a* and/or the unreachable feed segment 211*b* are included in the historical information 930 in some embodiments. This historical information is stored in a training library in some embodiments. Labels included in the training library indicate volumes and/or weights associated with each of the reachable feed and/or unreachable feed represented by the historical information 930.

Feature determination module 950*a* determines one or more features 960 from this historical information 930. Stated generally, features 960 are a set of the information input and are determined to be predictive of a particular outcome. In some examples, the features 960 may be all the historical information 930, but in other examples, the features 960 are a subset of the historical information 930. The machine learning algorithm 970 produces a model 918 based upon the features 960 and the labels.

In the prediction module 920, current information 990 may be input to the feature determination module 950*b*. The current information 990 in the disclosed embodiments include similar indications of that described above with respect to the historical information 930. However, the current information 990 provides these indications for a vehicle stopping point (e.g. user seeking a pick-up or drop off location). The current information 990 also includes possible secondary routes for the user to take when either traveling to the pick-up location or from a drop off location.

Feature determination module 950*b* determines, in some embodiments, an equivalent set of features or a different set of features from the current information 990 as feature determination module 950*a* determined from historical information 930. In some examples, feature determination module 950*a* and 950*b* are the same module. Feature determination module 950*b* produces features 915, which is input into the model 918 to generate a one or more routes and corresponding pick-up or drop off locations relating to those routes. The training module 910 may operate in an offline manner to train the model 918. The prediction module 920, however, may be designed to operate in an online manner. It should be noted that the model 918 may be periodically updated via additional training and/or user feedback.

The prediction module 920 generates one or more outputs 995. The outputs include, in some embodiments, one or more vehicle stopping points (e.g. pick-up/drop-off/parking locations) and routes between those vehicle stopping points (e.g., pick-up/drop-off/parking locations) and a second point. In some embodiments, predicted travel times or durations (e.g. walking times, roller skating times, scooter times, or bicycling times) associated with each of the pick-up/drop-off/parking locations are also provided by the ML model.

The machine learning algorithm 970 may be selected from among many different potential supervised or unsupervised machine learning algorithms. Examples of supervised learning algorithms include artificial neural networks, Bayesian networks, instance-based learning, support vector machines, decision trees (e.g., Iterative Dichotomiser 3, C4.5, Classification and Regression Tree (CART), Chi-squared Automatic Interaction Detector (CHAID), and the like), random forests, linear classifiers, quadratic classifiers, k-nearest neighbor, linear regression, logistic regression, hidden Markov models, models based on artificial life, simulated annealing, and/or virology. Examples of unsupervised learning algorithms include expectation-maximization algorithms, vector quantization, and information bottleneck method. Unsupervised models may not have a training module 910. In an example embodiment, a regression model is used and the model 918 is a vector of coefficients corresponding to a learned importance for each of the features in the vector of features 960, 915. In some embodiments, to calculate a score, a dot product of the features 915 and the vector of coefficients of the model 918 is taken.

Figure 10:
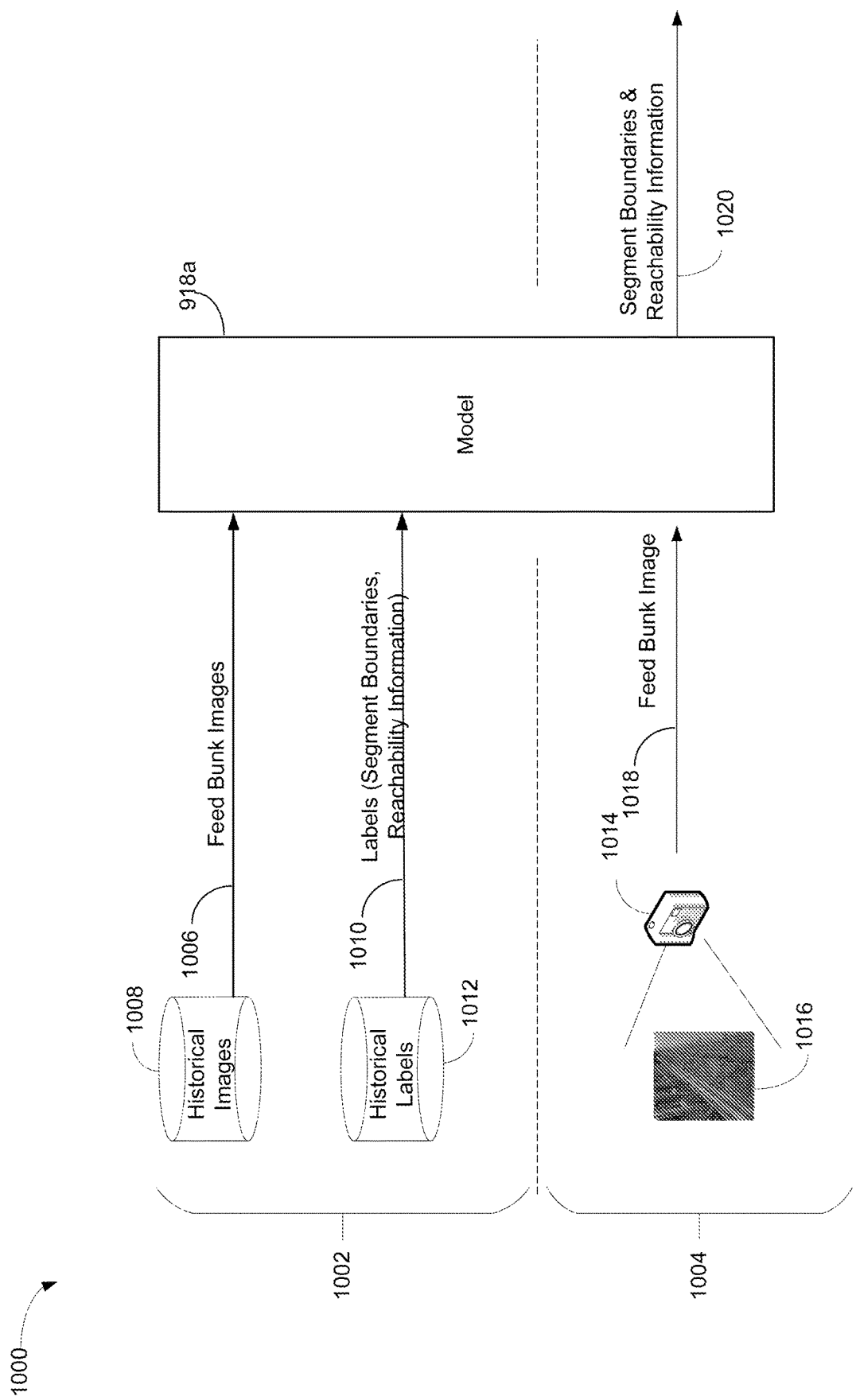
FIG. 10 is a diagram illustrating data flow in one or more of the disclosed embodiments.

FIG. 10 is a diagram illustrating data flow in one or more of the disclosed embodiments. The data flow 1000 of FIG. 10 includes two portions. A training data flow 1002 shows data flow during training of a machine learning model 918*a*, which is an example of the model 918 discussed above with respect to FIG. 9. A usage data flow 1004 represents data flow during a use of the machine learning model 918*a* to predict segment boundaries of a feed bunk, such as any one or more of the boundaries 108*a-d* of segment 102*a*, or other boundaries of any of the segments 102*b-c* and/or the segments 106*a-c* illustrated with respect to FIG. 1 above.

Within the training data flow 1002, FIG. 10 shows feed bunk images 1006 obtained from a historical images data store 1008 being provided to the machine learning model 918*a*. The training data flow 1002 also provides corresponding labels for each of the feed bunk images 1006, shown as label information 1010, which is obtained from a historical labels data store 1012. The label information 1010 includes information defining segment boundaries within feed bunk images 1006 from the historical images data store 1008. In some embodiments, the label information 1010 also indicates whether segments defined by the segment boundaries represent reachable segments or unreachable segments. Thus, for example, in the case of the segments 102*a-c* and segments 106*a-c* of FIG. 1 being included in training data such as that stored in the historical images data store 1008 and the historical labels data store 1012, the label information 1010 indicates, for example, the boundaries 108*a-c* and boundaries 110*a-d* of segment 102*a* and segment 106*a* respectively, and also information indicating whether each of segment 102*a* and/or segment 106*a* represent reachable or unreachable segments. For example, in the example of FIG. 1, the label information 1010 indicates the segment 102*a* is a reachable segment and the segment 106*a* is an unreachable segment.

The training data flow 1002 results in a machine learning model 918*a* that is able to predict feed bunk segment boundaries. In some embodiments, a feed bunk segmenter module 1208, discussed below with respect to FIG. 12, employs the machine learning model 918*a* to determine boundaries of feed bunk segments.

The usage data flow 1004 shows an imaging sensor 1014 capturing an image of a feed bunk 1016. The image of the feed bunk 1016 is provided to the machine learning model 918a. As a result of the training data flow 1002, the machine learning model 918a is able to predict segment boundaries 1020 of the feed bunk 1016. In some embodiments, output of the machine learning model 918a also includes reachability information. For example, to the extent the segment boundaries 1020 provide for one or more enclosed segments within a feed bunk, the machine learning model 918a also indicates, in at least some embodiments, whether the one or more enclosed segments are reachable or unreachable.

Figure 11:
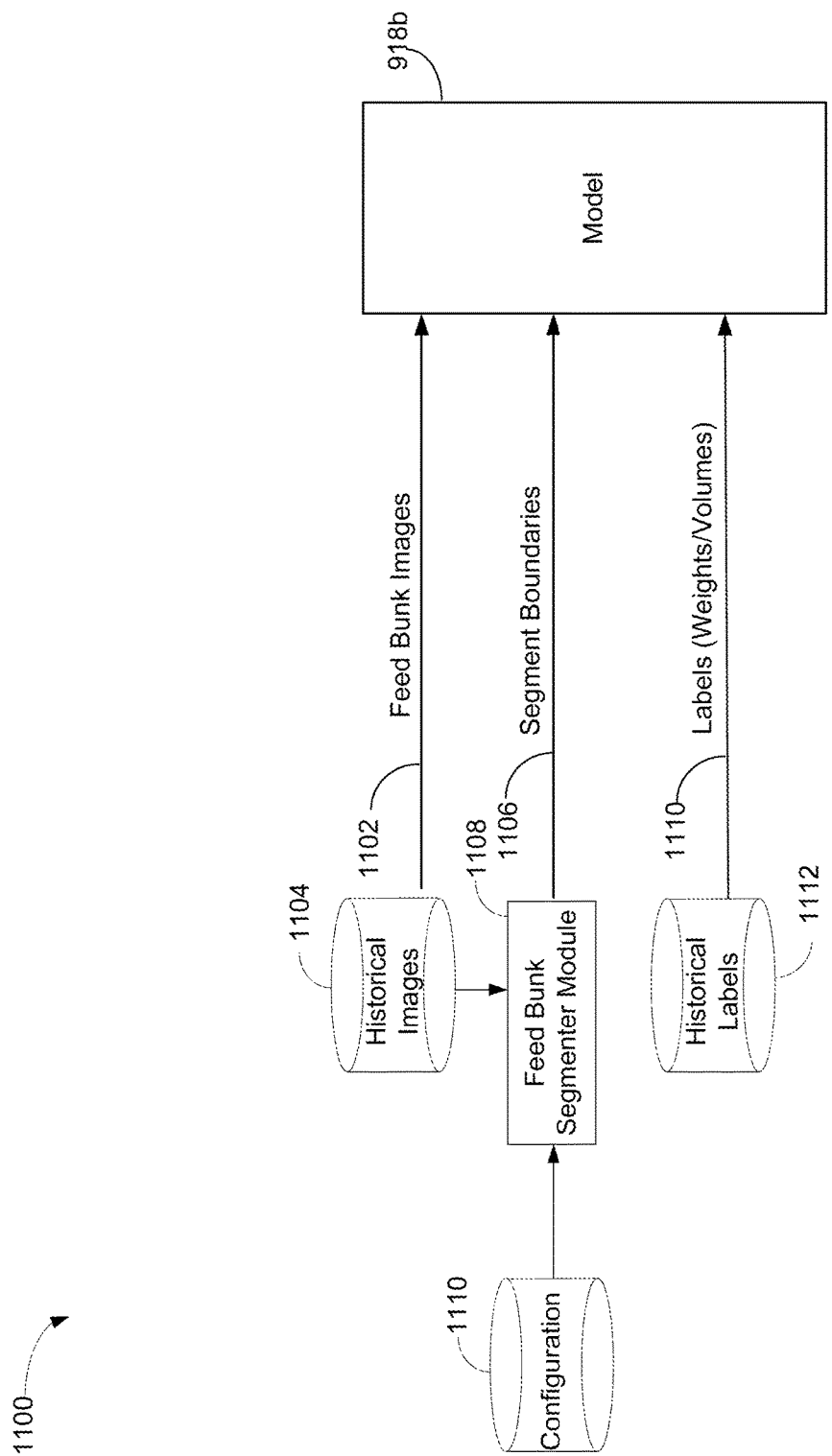
FIG. 11 shows an example training data flow for a machine learning model.

FIG. 11 shows an example training data flow 1100 for a machine learning model 918b. The training data flow 1100 shows feed bunk images 1102 obtained from a historical images data store 1104 being provided to a model 918b. Also provided to the model 918b are segment boundaries 1106 corresponding to the feed bunk images 1102. The segment boundaries 1106 are provided by a feed bunk segmenter module 1108, which receives the feed bunk images 1102 from the historical images data store 1104, and determines locations of the segment boundaries 1106. In some embodiments, the feed bunk segmenter module 1108 relies on the machine learning model 918a to predict locations of segments and/or segment boundaries within the feed bunk images 1102. The feed bunk segmenter module 1108 represents a logical and/or physical grouping of computer processor instructions that configure one or more hardware processors to perform one or more functions attributed to the feed bunk segmenter module 1108.

FIG. 11 also shows labels 1110 being provided to the model 918b during the training data flow 1100. The labels 1110 indicates weights and/or volumes of feed associated with segments indicated by the segment boundaries 1106. The weights and/or volumes are obtained from a historical labels data store 1112. The training data flow 1100 prepares the model 918b to provide predictions of weights and/or volumes of feed present in other images, as discussed below with respect to FIG. 12.

Figure 12:
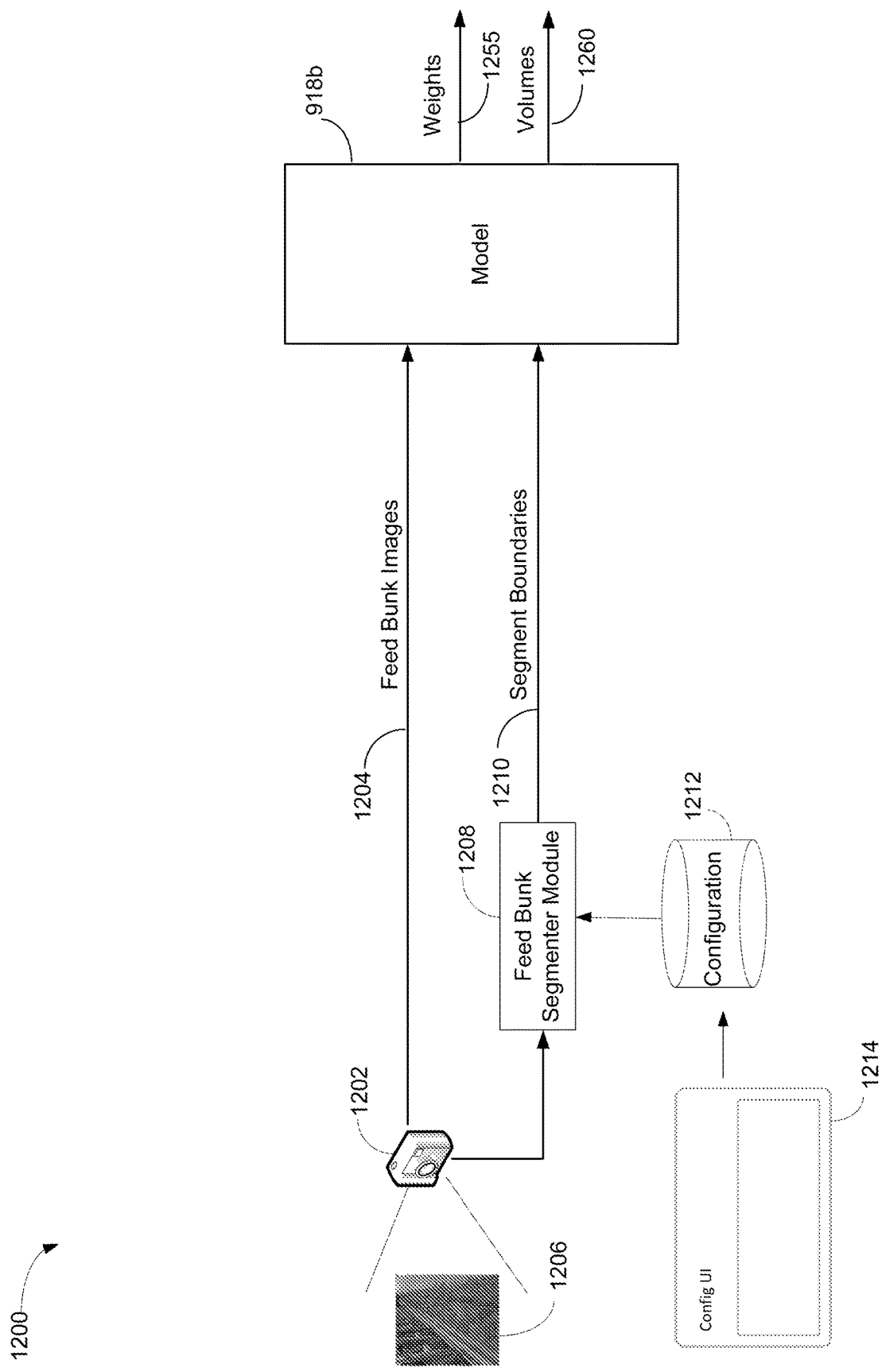
FIG. 12 is an example machine learning model data flow.

FIG. 12 is an example usage data flow 1200 of the machine learning model 918b trained in the training data flow 1100 of FIG. 11. The usage data flow 1200 shows an imaging sensor 1202 capturing an image 1204 of a feed bunk 1206. The image 1204 is provided to a feed bunk segmenter module 1208, which determines segment boundary information 1210 within the image 1204 of the feed bunk 1206. In some embodiments, the feed bunk segmenter module 1208 utilizes the machine learning model 918a, discussed above with respect to FIG. 10 to determine segment boundary information 1210 within the image 1204 of the feed bunk 1206. In some other embodiments, segment boundary information 1210 (e.g. segment boundary position(s), reachability or unreachability of segments defined by the boundaries) of the feed bunk 1206 are determined via configuration information stored in a configuration data store 1212. In some embodiments, the segment boundary information 1210 are established by input from a user interface 1214. For example, some embodiments provide a user interface that allows for defining segment boundaries of a feed bunk by overlaying boundary lines on an image of a feed bunk. In some embodiments, the feed bunk segmenter module 1208 is equivalent to the feed bunk segmenter module 1108.

The usage data flow 1200 shows that as a result of being provided the image 1204 and the segment boundary information 1210, the model 918b provides one or more of weight information 1255 and/or volume information 1260 of feed within segments defined by the segment boundary information 1210.

Figure 13:
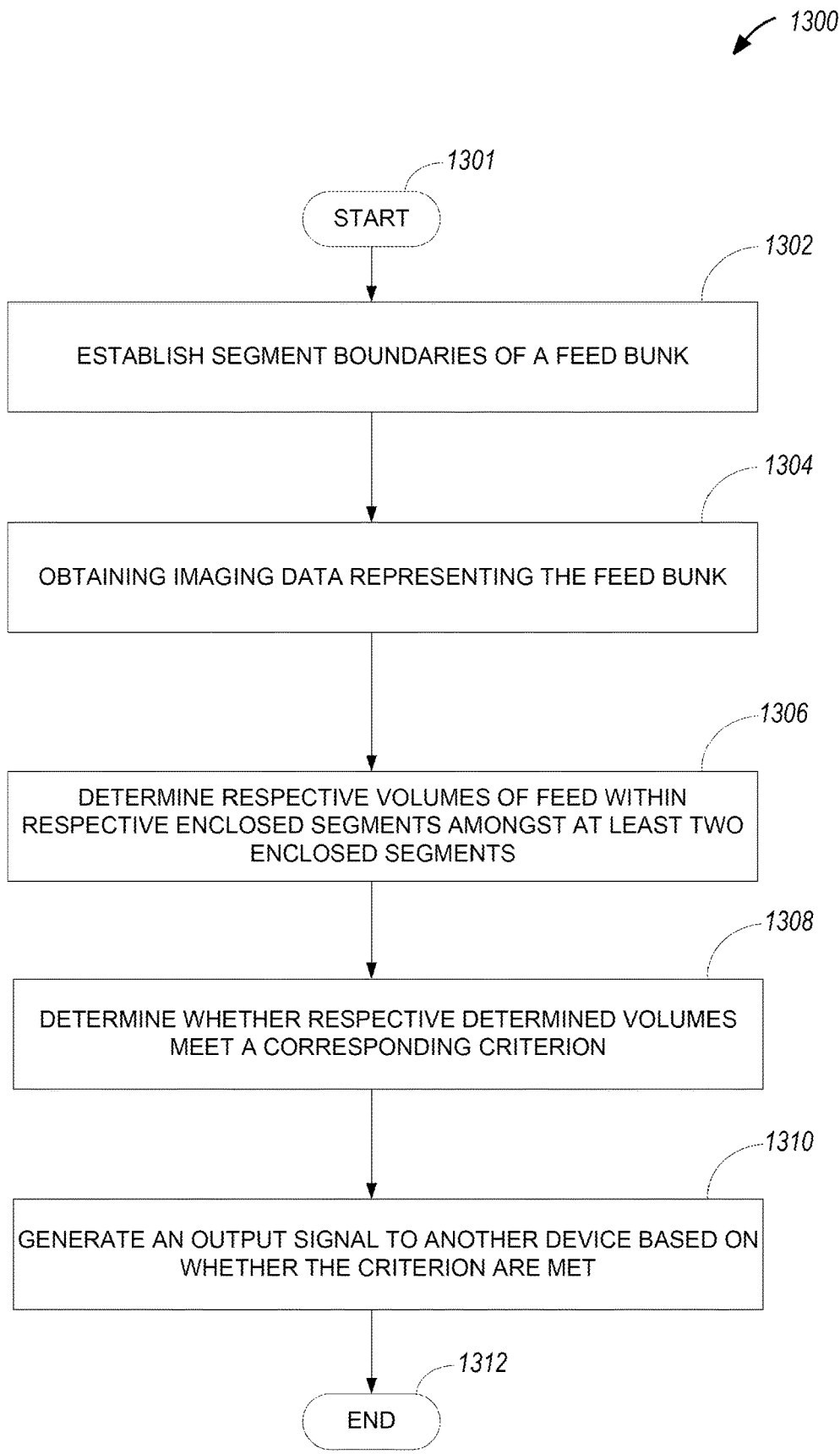
FIG. 13 is a flowchart of an example method of determining volumes and/or weights of feed in a plurality of segments of a feed bunk.

FIG. 13 is a flowchart of an example method of determining volumes and/or weights of feed in a plurality of segments of a feed bunk. In some embodiments, one or more of the operations discussed below with respect to method 1300 and FIG. 13 is performed by hardware processing circuitry. For example, in some embodiments, instructions (e.g. instructions 1424 discussed below) stored in a memory (e.g. memory 1404 and/or memory 1406 discussed below) configure hardware processing circuitry (e.g. hardware processor 1402 discussed below) to perform one or more of the operations discussed below with respect to method 1300 and/or FIG. 13. In some embodiments, the method 1300 is performed by the control system 212, discussed above with respect to FIGS. 2 and/or 3.

After start operation 1301, method 1300 moves to operation 1302. In operation 1302, segment boundaries of a feed bunk are established. The segment boundaries enclose or encompass a portion of an area of the feedback. At least two enclosed segments are defined by at least two sets of segment boundaries. For example, as discussed above with respect to FIG. 1, the segments 102a-c and segments 106a-c are defined within the illustrated feed bunk. Segment boundaries 108a-d define the segment 102a. Boundaries 110a-d define the segment 106a. Other boundaries define segments 102b-c and 106a-c.

In some embodiments, establishing the segment boundaries includes defining a plurality of rows of enclosed segments, with the rows extending longitudinally along the feed bunk and substantially parallel to each other. For example, as shown in FIG. 1, segments 102a-c represent a first row of segments while segments 106a-c collectively represent a second row of segments. The first row and second row in FIG. 1 are substantially parallel to each other. In some embodiments, segments in a first row have corresponding segments in the second row. For example, the segment 102a in the first row has a corresponding segment 106a in the second row in FIG. 1. The segments correspond in that they have a common segment boundary (e.g., boundary 108a). Corresponding segments also have two pairs of other boundaries, with boundaries within a pair arranged linearly to each other. For example, the boundary 108b of segment 102a is arranged linearly with the boundary 110b of segment 106a. The boundary 108d of segment 102a is arranged linearly with the boundary 110d of segment 106a.

In some embodiments, the segment boundaries are established based on input from a user interface. For example, as discussed above with respect to FIG. 12, in some embodiments, a user interface (e.g. user interface 1214) is displayed by operation 1302 and is configured to accept user input that defines the segment boundaries (e.g. the boundaries 108a-d and/or the boundaries 110a-d). In some embodiments, the user interface is configured to accept input defining a length of a dimension of a segment boundary. For example, the user interface accepts, in some embodiments, one or more of a length dimension or width dimension of one or more segments within the feed bunk.

In some other embodiments, the boundaries are established via a machine learning model. For example, as discussed above with respect to FIG. 10, some embodiments use a trained machine learning model (e.g. machine learning model 918a trained via training data flow 1002) to facilitate predictions of segment boundaries (e.g. segment boundaries 1020) of an image (e.g. feed bunk image 1018) captured from an imaging sensor (e.g., imaging sensor 1014) of a feed bunk (e.g., feed bunk 1016). In some embodiments, the segment boundaries are determined by the machine learning model based on laser light detection and ranging (LIDAR) point cloud data representing the feed bunk which is provided to the machine learning model. In some embodiments, the machine learning model is trained to operate on visual or passive optical images. In some embodiments, operation 1302 determines whether each of the segments represents a reachable area of a feed bunk or an unreachable area of the feed bunk. For example, as discussed above with respect to FIG. 10, in some embodiments, a machine learning model is trained to indicate reachability or unreachability of segments. In some embodiments, whether a segment is reachable or unreachable is based on a distance from the segment to an animal access area (e.g. animal access area 104). In some embodiments, the distance is configurable, or based on a type of animal accessing the feed bunk.

In operation 1304, imaging data representing a feed bunk is obtained. For example, as discussed above with respect to FIG. 1, an imaging sensor (e.g. such as imaging sensors 204a and/or imaging sensor 204b) capture an image of a feed bunk (e.g. feed bunk 202a or feed bunk 202b respectively). In some embodiments, the imaging sensor is a LIDAR sensor and the imaging data defines a LIDAR point cloud. In some embodiments, the imaging sensor is a passive optical sensor and the image captured is a snapshot or visual range image.

In operation 1306, respective volumes (and/or weights) of feed within enclosed segments of the feed bunk are determined. For example, as discussed above with respect to FIG. 1, operation 1306 determines volumes of feed within each of the segments 102a-c and/or 106a-c. In some embodiments, operation 1306 relies on a trained machine learning model to compute the volume of feed (and/or weight of feed) from the imaging data captured by the imaging sensor. For example, as discussed above with respect to FIG. 12, some embodiments utilize a trained machine learning model (e.g. model 918b) to provide volume and/or weight information (e.g. weight information 1255 and/or volume information 1260). To determine volumes and/or weights of feed with the segments, in some embodiments, data defining boundaries between the segments is provided to the machine learning model. For example, FIG. 12 shows segment boundary information 1210 being provided to the machine learning model 918b. In some embodiments volume determination is based on comparing a reference LIDAR point cloud of a feed volume to a LIDAR point cloud of a segment in the feed bunk. For example, some embodiments determine a volume in vector space occupied by an object defined by the collected LIDAR point cloud, and translate the vector space volume to a real world volume measurement. Some other embodiments compare a reference LIDAR point cloud for which a reference volume and/or feed weight is available, to a LIDAR point cloud of feed within a segment of the feed bunk. A percentage volume of the collected point cloud relative to the reference LIDAR point cloud is used to determine a percentage of the reference volume and/or the reference weight that exists in the imaged feed bunk segment.

In some embodiments, a volume and/or weight of feed determined to be included in a first segment represent a reachable volume or weight of feed, while a second volume and/or second weight of feed determined to be included in a second segment represents an unreachable volume or weight of feed. For example, as discussed above, the segment 102a represents a reachable portion of the feed bunk, and therefore any feed weight and/or volume determined to be included in the segment 102a is considered a reachable volume and/or weight of food. The segment 106a represents an unreachable portion of the feed bunk, and thus any feed volume or weight that is determined to be included in the segment 106a is considered unreachable volume and/or weight of feed.

Some embodiments determine a weight of feed based on a determined volume of feed. In some embodiments, this determination is aided by input from one or more sensors. For example, as a water content of feed can affect its density, input from a humidity or moisture sensor is used, in some embodiments, to approximate a density of a known feed type, which can assist a conversion of a feed volume determination to a feed weight determination. In some other embodiments, a feed bunk is equipped with scales that can weight an amount of feed within the feed bunk directly, and electronically transmit this weight information to the control system 212.

Operation 1308 determines whether the determined volumes (and/or weights) of feed in each of the enclosed segments meet a corresponding criterion. In some embodiments, the criterion define a minimum volume and/or weight of feed in one or more of the segments. In some embodiments, if a volume of feed in a reachable first segment is below a predefined threshold, operation 1308 determines, in some embodiments, a feed shortage condition. In some embodiments, operation 1308 determines if a reachable first segment volume or weight is below a predefined threshold amount, and whether an unreachable second segment corresponding to the reachable segment includes a feed volume and/or weight above a second predefined threshold amount. In this case, a shortage of reachable feed in the first segment is considered, in at least some embodiments, a result of animals pushing the feed from the reachable first segment to the unreachable second segment. Thus, in some embodiments, when these two criterion are met, operation 1310 below triggers or otherwise generates an alert indicating a push up operation should be performed to move some of that unreachable volume/weight of food from the second segment to the first segment. In some embodiments, method 1300 activates a feed pusher motor 310 to affect the movement of feed from the second segment to the first segment.

In operation 1310, an output signal is generated based on whether the criterion are met. For example, as discussed above, in some embodiments, one or more reports or electronic display outputs are generated (e.g. to the report printer 214 and/or the smart phone 216). In some embodiments, an alert is generated based on the criterion being met. As discussed with respect to FIG. 3, some embodiments generate an output signal that controls an electronically controlled feeder or feed dispenser 306 to dispense feed to the feed bunk (e.g., feed bunk 302). Some embodiments determine a quantity of feed to be dispensed to the feed bunk or segment based at least in part, on a measured refusal amount, unreachable refusal amount, and/or reachable refusal amount of feed in the feed bunk or segment.

In some embodiments, if a feed shortage condition is detected by operation 1308, operation 1310 generates an alert or other notice indicating said food shortage condition. As discussed above, in some embodiments, a feed shortage condition Some embodiments of method 1300 include detecting a feeding event. In some embodiments, detection of the feeding event includes detecting activation of the feed dispenser 306. In other embodiments, input is received via a user interface indicating a feeding event has occurred at a particular feed bunk. In some other embodiments, a feeding event is detected by comparing sequential volume/weight determinations of a segment. If the sequential volume/weight increases, some embodiments detect a feeding event. In some embodiments, such a feeding event is only detected if a volume of feed in an unreachable segment corresponding to a reachable segment remains unchanged or increases. For example, if a volume/weight decrease of feed in an unreachable segment is associated with an increase in feed volume/weight in a corresponding reachable segment, no feeding event is detected at least in some embodiments (as the increase in volume in the reachable segment is a result of a push up operation that moves feed volume/weight from the unreachable segment to the reachable segment. In some embodiments, detection of a feeding event is based on a time of day. For example, some embodiments support configuration parameters that define feeding events to occur at particular time(s) during a day. Some embodiments utilize machine learning algorithms to detecting feeding activity. For example, some embodiments analyze passive optical and/or LIDAR imaging data to detect presence of feeding equipment proximate to the feed bunk, or the physical addition of feed to the feed bunk as a feeding event.

Detection of a feeding event, in some embodiments, causes a determination of a volume and/or weight of remaining feed in reachable segments immediately before the feeding event occurred. Some embodiments consider this remaining feed as refusal feed, and thus refusal volumes and/or weights are determined. Upon detection of a feeding event, some embodiments determine a volume and/or weight of remaining feed in each unreachable segment immediately prior to the feeding event. Some embodiments classify a volume and/or weight of feed remaining in unreachable segments to be unreachable refusal volumes and/or weights. In some embodiments, reachable refusal and unreachable refusal volumes and/or weights in corresponding segments (e.g. a reachable segment and its corresponding unreachable segment), such as segments 102*a* and 106*a*, 102*b* and 106*b*, or 103*c* and 106*c*, are aggregated (e.g. summed) to determine a measured refusal amount for the two segments. This process may be repeated for multiple sets of corresponding segments.

After operation 1310 completes, method 1300 moves to end operation 1312.

Figure 14:
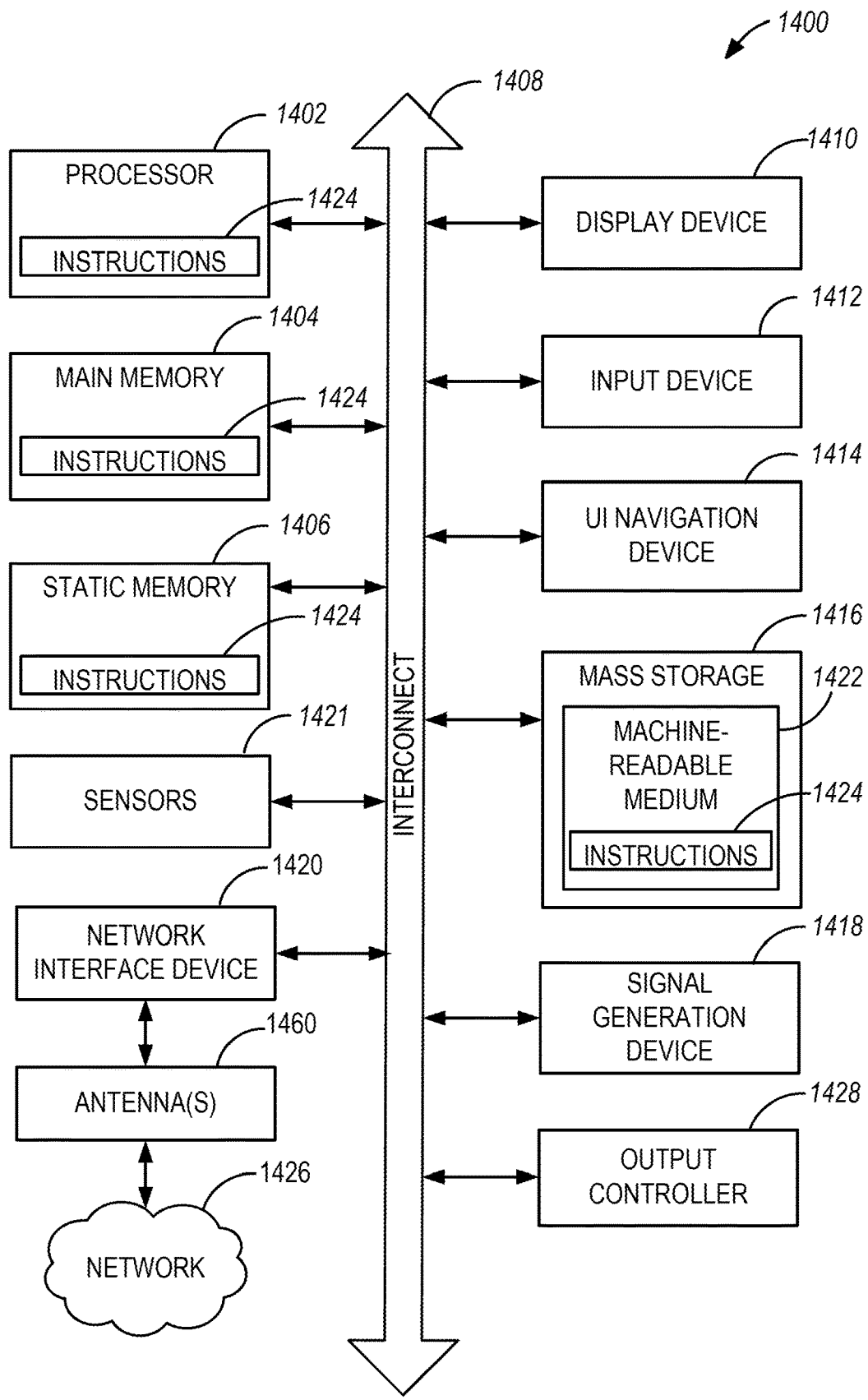
FIG. 14 illustrates a block diagram of an example machine upon which any one or more of the techniques (e.g., methodologies) discussed herein may perform.

FIG. 14 illustrates a block diagram of an example machine 1400 upon which any one or more of the techniques (e.g., methodologies) discussed herein may perform. Machine 1400 (e.g., computer system) may include a hardware processor 1402 (e.g., a central processing unit (CPU), a graphics processing unit (GPU), a hardware processor core, or any combination thereof), a main memory 1404 and a static memory 1406, some or all of which may communicate with each other via an interlink 1408 (e.g., bus). In some embodiments, the example machine 1400 is implemented by the control system 212.

Specific examples of main memory 1404 include Random Access Memory (RAM), and semiconductor memory devices, which may include, in some embodiments, storage locations in semiconductors such as registers. Specific examples of static memory 1406 include non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; RAM; and CD-ROM and DVD-ROM disks.

The machine 1400 may further include a display device 1410, an input device 1412 (e.g., a keyboard), and a user interface (UI) navigation device 1414 (e.g., a mouse). In an example, the display device 1410, input device 1412 and UI navigation device 1414 may be a touch screen display. The machine 1400 may additionally include a mass storage device 1416 (e.g., drive unit), a signal generation device 1418 (e.g., a speaker), a network interface device 1420, and one or more sensors 1421, such as a global positioning system (GPS) sensor, compass, accelerometer, or some other sensor. The machine 1400 may include an output controller 1428, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.). In some embodiments the hardware processor 1402 and/or instructions 1424 may comprise processing circuitry and/or transceiver circuitry.

The mass storage device 1416 may include a machine readable medium 1422 on which is stored one or more sets of data structures or instructions 1424 (e.g., software) embodying or utilized by any one or more of the techniques or functions described herein. The instructions 1424 may also reside, completely or at least partially, within the main memory 1404, within static memory 1406, or within the hardware processor 1402 during execution thereof by the machine 1400. In an example, one or any combination of the hardware processor 1402, the main memory 1404, the static memory 1406, or the mass storage device 1416 constitutes, in at least some embodiments, machine readable media.

Specific examples of machine readable media include, one or more of non-volatile memory, such as semiconductor memory devices (e.g., EPROM or EEPROM) and flash memory devices; magnetic disks, such as internal hard disks and removable disks; magneto-optical disks; RAM; and CD-ROM and DVD-ROM disks.

While the machine readable medium 1422 is illustrated as a single medium, the term "machine readable medium" includes, in at least some embodiments, a single medium or multiple media (e.g., a centralized or distributed database, and/or associated caches and servers) configured to store the one or more instructions 1424.

An apparatus of the machine 1400 includes, in at least some embodiments, one or more of a hardware processor 1402 (e.g., a central processing unit (CPU), a graphics processing unit (GPU), a hardware processor core, or any combination thereof), a main memory 1404 and a static memory 1406, sensors 1421, network interface device 1420, antennas 1460, a display device 1410, an input device 1412, a UI navigation device 1414, a mass storage device 1416, instructions 1424, a signal generation device 1418, and an output controller 1428. The apparatus is configured, in at least some embodiments, to perform one or more of the methods and/or operations disclosed herein. The apparatus is, in some embodiments, a component of the machine 1400 to perform one or more of the methods and/or operations disclosed herein, and/or to perform a portion of one or more of the methods and/or operations disclosed herein. In some embodiments, the apparatus includes, in some embodiments, a pin or other means to receive power. In some embodiments, the apparatus includes power conditioning hardware.

The term "machine readable medium" includes, in some embodiments, any medium that is capable of storing, encoding, or carrying instructions for execution by the machine 1400 and that cause the machine 1400 to perform any one or more of the techniques of the present disclosure, or that is capable of storing, encoding or carrying data structures used by or associated with such instructions. Non-limiting machine readable medium examples include solid-state memories, and optical and magnetic media. Specific examples of machine readable media include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; Random Access Memory (RAM); and CD-ROM and DVD-ROM disks. In some examples, machine readable media includes non-transitory machine readable media. In some examples, machine readable media includes machine readable media that is not a transitory propagating signal.

The instructions 1424 are further transmitted or received, in at least some embodiments, over a communications network 1426 using a transmission medium via the network interface device 1420 utilizing any one of a number of transfer protocols (e.g., frame relay, internet protocol (IP), transmission control protocol (TCP), user datagram protocol (UDP), hypertext transfer protocol (HTTP), etc.). Example communication networks include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi-Fi®), IEEE 802.15.4 family of standards, a Long Term Evolution (LTE) 4G or 5G family of standards, a Universal Mobile Telecommunications System (UMTS) family of standards, peer-to-peer (P2P) networks, satellite communication networks, among others.

In an example embodiment, the network interface device 1420 includes one or more physical jacks (e.g., Ethernet, coaxial, or phone jacks) or one or more antennas to connect to the communications network 1426. In an example embodiment, the network interface device 1420 includes one or more antennas 1460 to wirelessly communicate using at least one of single-input multiple-output (SIMO), multiple-input multiple-output (MIMO), or multiple-input single-output (MISO) techniques. In some examples, the network interface device 1420 wirelessly communicates using Multiple User MIMO techniques. The term "transmission medium" shall be taken to include any intangible medium that is capable of storing, encoding or carrying instructions for execution by the machine 1400, and includes digital or analog communications signals or other intangible medium to facilitate communication of such software.

At least some example embodiments, as described herein, include, or operate on, logic or a number of components, modules, or mechanisms. Modules are tangible entities (e.g., hardware) capable of performing specified operations and are configured or arranged in a certain manner. In an example, circuits are arranged (e.g., internally or with respect to external entities such as other circuits) in a specified manner as a module. In an example, the whole or part of one or more computer systems (e.g., a standalone, client or server computer system) or one or more hardware processors are configured by firmware or software (e.g., instructions, an application portion, or an application) as a module that operates to perform specified operations. In an example, the software resides on a machine readable medium. In an example, the software, when executed by the underlying hardware of the module, causes the hardware to perform the specified operations.

Accordingly, the term "module" is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which modules are temporarily configured, each of the modules need not be instantiated at any one moment in time. For example, where the modules comprise a general-purpose hardware processor configured using software, in some embodiments, the general-purpose hardware processor is configured as respective different modules at different times. Software accordingly configures a hardware processor, for example, to constitute a particular module at one instance of time and to constitute a different module at a different instance of time.

Some embodiments are implemented fully or partially in software and/or firmware. This software and/or firmware takes the form of instructions contained in or on a non-transitory computer-readable storage medium, in at least some embodiments. Those instructions are then read and executed by one or more hardware processors to enable performance of the operations described herein, in at least some embodiments. The instructions are in any suitable form, such as but not limited to source code, compiled code, interpreted code, executable code, static code, dynamic code, and the like. Such a computer-readable medium includes any tangible non-transitory medium for storing information in a form readable by one or more computers, such as but not limited to read only memory (ROM); random access memory (RAM); magnetic disk storage media; optical storage media; flash memory, etc.

At least some examples, as described herein, include, or operate on, logic or a number of components, modules, or mechanisms. Modules are tangible entities (e.g., hardware) capable of performing specified operations and are configured or arranged in a certain manner. In an example, circuits are arranged (e.g., internally or with respect to external entities such as other circuits) in a specified manner as a module. In an example, the whole or part of one or more computer systems (e.g., a standalone, client or server computer system) or one or more hardware processors are configured by firmware or software (e.g., instructions, an application portion, or an application) as a module that operates to perform specified operations. In an example, the software resides on a machine readable medium. In an example, the software, when executed by the underlying hardware of the module, causes the hardware to perform the specified operations.

Accordingly, the term "module" is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which modules are temporarily configured, each of the modules need not be instantiated at any one moment in time. For example, where the modules comprise a general-purpose hardware processor configured using software, the general-purpose hardware processor is configured, in at least some embodiments, as respective different modules at different times. Software accordingly configures a hardware processor, for example in at least some embodiments, to constitute a particular module at one instance of time and to constitute a different module at a different instance of time.

Various embodiments may be implemented fully or partially in software and/or firmware. This software and/or firmware may take the form of instructions contained in or on a non-transitory computer-readable storage medium.

Those instructions are then read and executed by one or more processors to enable performance of the operations described herein. The instructions are in any suitable form, such as but not limited to source code, compiled code, interpreted code, executable code, static code, dynamic code, and the like. Such a computer-readable medium includes, in at least some embodiments, any tangible non-transitory medium for storing information in a form readable by one or more computers, such as but not limited to read only memory (ROM); random access memory (RAM); magnetic disk storage media; optical storage media; flash memory, etc.

The invention claimed is:

1. A method, comprising:
   establishing segment boundaries of a feed bunk, the segment boundaries encompassing a portion of an area of the feed bunk and defining at least two enclosed segments;
   obtaining, via an imaging sensor, imaging data representing the feed bunk;
   based on the imaging data and using at least one processor circuit:
   determining respective volumes of feed within respective enclosed segments amongst the at least two enclosed segments;
   determining whether respective determined volumes meet a corresponding criterion; and
   generating an output signal to another device based on whether at least one of the determined volumes meets the corresponding criterion;
   wherein establishing the segment boundaries comprises defining respective rows of enclosed segments, the rows extending longitudinally along the feed bunk substantially parallel with each other.

2. The method of claim 1, wherein respective enclosed segments in a first row amongst the respective rows correspond to respective enclosed segments in a second row amongst the respective rows.

3. The method of claim 1, wherein the imaging sensor is a light detection and ranging (LIDAR) sensor, the imaging data is a first lidar point cloud, and the determining of the respective volumes is based on the first LIDAR point cloud.

4. The method of claim 3, further comprising:
   providing the first LIDAR point cloud to a machine learning model; and
   establishing, using the machine learning model, a location of a boundary between a first row of enclosed segments and a second row of enclosed segments.

5. The method of claim 4, further comprising obtaining, from the machine learning model, a second boundary of the first row of enclosed segments, and a third boundary of the second row of enclosed segments, wherein the determining of the respective volumes of feed comprises:
   determining a volume of feed in the first row of enclosed segments based on the first boundary and the second boundary; and
   determining of the volume of feed in the second row of enclosed segments is based on the first boundary and the third boundary.

6. The method of claim 3, wherein the determining of the respective volumes determines a difference between a reference lidar point cloud and the first LIDAR point cloud.

7. The method of claim 1, wherein the imaging sensor is a passive optical imaging sensor, and the method further comprising providing the imaging data to a machine learning model, and receiving, from the machine learning model, label data representative of an estimate of respective volumes of feed within respective enclosed segments.

8. The method of claim 1, further comprising providing the imaging data to a machine learning model, and receiving, from the machine learning model, an indication of whether the feed bunk includes an unreachable feed area, wherein the establishing the respective segment boundaries includes defining at least one respective enclosed segment corresponding to an unreachable feed area.

9. The method of claim 1, further comprising:
   causing display of an image of the feed bunk on a display; and
   receiving input defining the segment boundaries, wherein the determination of the respective volumes of feed within respective enclosed segments is based on the input received.

10. The method of claim 1, further comprising receiving input defining at least one dimension of a respective segment boundary.

11. The method of claim 1, further comprising determining a feed shortage condition based on a determined volume of feed in a first enclosed segment meeting a criterion, the first enclosed segment defined by the segment boundaries in a first row of enclosed segments boundaries, wherein the output signal is triggered by the determined feed shortage condition.

12. The method of claim 11, further comprising determining the feed shortage condition is due to unreachable feed based on a second determined volume of feed in another enclosed segment defined by the segment boundaries in another row of enclosed segments.

13. The method of claim 1, wherein the segment boundaries define a first row of enclosed segments and a second row of enclosed segments.

14. The method of claim 13, further comprising:
   detecting a feeding event; and
   determining, based on the respective determined volumes of remaining feed in respective enclosed segments in the first row, refusal volumes of the respective enclosed segments in the first row, wherein the generating of the output signal is based on the determined refusal volumes.

15. The method of claim 13, further comprising:
   determining, based on the respective determined volumes of feed in respective enclosed segments in the second row of segments, an unreachable refusal volume of each of the second row of segments, wherein the generating of the output signal is based on the determined unreachable refusal volumes.

16. The method of claim 15, further comprising determining a measured refusal by summing refusal volumes and unreachable refusal volumes in corresponding enclosed segments of the first row and the second row, wherein the generating of the output signal is based on the determined measured refusal volume.

17. The method of claim 1, further comprising:
   receiving input from a sensor; and
   determining a density of feed based on the input.

18. The method of claim 17, further comprising determining a weight of feed based on the determined volumes and a density of the feed, wherein the generating of the output signal is based on the determined weight of feed.

19. The method of claim 1, further comprising controlling operation of a mechanized feeder based on the output signal.

20. A method, comprising:
- establishing segment boundaries of a feed bunk, the segment boundaries encompassing a portion of an area of the feed bunk and defining at least two enclosed segments;
- obtaining, via an imaging sensor, imaging data representing the feed bunk;
- based on the imaging data and using at least one processor circuit:
- determining respective volumes of feed within respective enclosed segments amongst the at least two enclosed segments;
- determining whether respective determined volumes meet a corresponding criterion; and
- generating an output signal to another device based on whether at least one of the determined volumes meets the corresponding criterion; and
- further comprising providing the imaging data to a machine learning model, and receiving, from the machine learning model, an indication of whether the feed bunk includes an unreachable feed area, wherein the establishing the respective segment boundaries includes defining at least one respective enclosed segment corresponding to an unreachable feed area.

21. The method of claim 20, wherein establishing the segment boundaries comprises defining respective rows of enclosed segments, the rows extending longitudinally along the feed bunk substantially parallel with each other.

22. The method of claim 21, wherein respective enclosed segments in a first row amongst the respective rows correspond to respective enclosed segments in a second row amongst the respective rows.

23. The method of claim 20, wherein the imaging sensor is a light detection and ranging (LIDAR) sensor, the imaging data is a first lidar point cloud, and the determining of the respective volumes is based on the first LIDAR point cloud.

24. The method of claim 23, further comprising:
- providing the first LIDAR point cloud to a machine learning model; and
- establishing, using the machine learning model, a location of a boundary between a first row of enclosed segments and a second row of enclosed segments.

25. The method of claim 24, further comprising obtaining, from the machine learning model, a second boundary of the first row of enclosed segments, and a third boundary of the second row of enclosed segments, wherein the determining of the respective volumes of feed comprises:
- determining a volume of feed in the first row of enclosed segments based on the first boundary and the second boundary; and
- determining of the volume of feed in the second row of enclosed segments is based on the first boundary and the third boundary.

26. The method of claim 23, wherein the determining of the respective volumes determines a difference between a reference lidar point cloud and the first LIDAR point cloud.

27. The method of claim 20, wherein the imaging sensor is a passive optical imaging sensor, and the method further comprising providing the imaging data to a machine learning model, and receiving, from the machine learning model, label data representative of an estimate of respective volumes of feed within respective enclosed segments.

28. The method of claim 20, further comprising:
- causing display of an image of the feed bunk on a display; and
- receiving input defining the segment boundaries, wherein the determination of the respective volumes of feed within respective enclosed segments is based on the input received.

29. The method of claim 20, further comprising receiving input defining at least one dimension of a respective segment boundary.

30. The method of claim 20, further comprising determining a feed shortage condition based on a determined volume of feed in a first enclosed segment meeting a criterion, the first enclosed segment defined by the segment boundaries in a first row of enclosed segments boundaries, wherein the output signal is triggered by the determined feed shortage condition.

31. The method of claim 30, further comprising determining the feed shortage condition is due to unreachable feed based on a second determined volume of feed in another enclosed segment defined by the segment boundaries in another row of enclosed segments.

32. The method of claim 20, wherein the segment boundaries define a first row of enclosed segments and a second row of enclosed segments.

33. The method of claim 32, further comprising:
- detecting a feeding event; and
- determining, based on the respective determined volumes of remaining feed in respective enclosed segments in the first row, refusal volumes of the respective enclosed segments in the first row, wherein the generating of the output signal is based on the determined refusal volumes.

34. The method of claim 32, further comprising:
- determining, based on the respective determined volumes of feed in respective enclosed segments in the second row of segments, an unreachable refusal volume of each of the second row of segments, wherein the generating of the output signal is based on the determined unreachable refusal volumes.

35. The method of claim 34, further comprising determining a measured refusal by summing refusal volumes and unreachable refusal volumes in corresponding enclosed segments of the first row and the second row, wherein the generating of the output signal is based on the determined measured refusal volume.

36. The method of claim 20, further comprising:
- receiving input from a sensor; and
- determining a density of feed based on the input.

37. The method of claim 36, further comprising determining a weight of feed based on the determined volumes and a density of the feed, wherein the generating of the output signal is based on the determined weight of feed.

38. The method of claim 20, further comprising controlling operation of a mechanized feeder based on the output signal.

* * * * *